(12) United States Patent
Calendrille, Jr.

(10) Patent No.: US 8,584,550 B1
(45) Date of Patent: Nov. 19, 2013

(54) SHIFT LEVER ARRANGEMENT FOR A BICYCLE

(76) Inventor: John L. Calendrille, Jr., Port Jefferson, NY (US)

( * ) Notice: Subject to any disclaimer, the term of this patent is extended or adjusted under 35 U.S.C. 154(b) by 604 days.

(21) Appl. No.: 12/780,981

(22) Filed: May 17, 2010

Related U.S. Application Data

(60) Provisional application No. 61/216,385, filed on May 18, 2009.

(51) Int. Cl.
*F16C 1/10* (2006.01)
*B62M 25/04* (2006.01)

(52) U.S. Cl.
CPC .................. *B62K 238/06* (2013.01); *B62M 25/04* (2013.01)
USPC .......................... 74/502.2; 74/489

(58) Field of Classification Search
USPC ....................... 74/502.2, 502, 489
See application file for complete search history.

(56) References Cited

U.S. PATENT DOCUMENTS

| | | | |
|---|---|---|---|
| 3,972,247 A | 8/1976 | Armstrong | |
| 4,100,820 A | 7/1978 | Evett | |
| 4,132,296 A | 1/1979 | Evett | |
| 4,319,673 A | 3/1982 | Kojima | |
| 4,532,825 A | 8/1985 | Nagano | |
| 4,800,768 A | 1/1989 | Kazuta | |
| 5,178,033 A | 1/1993 | Kund | |
| 5,241,878 A | 9/1993 | Nagano | |
| 5,257,683 A | 11/1993 | Romano | |
| 5,365,802 A * | 11/1994 | Suzuki et al. ................ 74/482 |
| 5,400,675 A | 3/1995 | Nagano | |
| 5,479,776 A | 1/1996 | Romano | |
| 5,542,310 A | 8/1996 | Lee | |
| 5,758,546 A * | 6/1998 | Taomo et al. ................ 74/501.6 |
| 5,862,709 A * | 1/1999 | Kageyama ..................... 74/489 |
| 5,921,138 A | 7/1999 | Kojima et al. | |
| 6,015,036 A | 1/2000 | Fukuda | |
| 6,095,309 A | 8/2000 | Mione | |
| 6,209,412 B1 * | 4/2001 | Hiratsuna et al. ............ 74/502.2 |
| 6,450,060 B1 * | 9/2002 | Shahana ..................... 74/502.2 |
| 6,553,860 B2 | 4/2003 | Blaschke | |
| 6,647,823 B2 | 11/2003 | Tsumiyama et al. | |
| 6,691,591 B2 | 2/2004 | Tsumiyama et al. | |
| 6,792,826 B2 | 9/2004 | Dal Pra' | |
| 7,252,300 B2 * | 8/2007 | Hargroder .................. 280/304.1 |
| 7,527,137 B1 | 5/2009 | Calendrille, Jr. | |
| 7,779,718 B2 * | 8/2010 | Jordan et al. ................. 74/502.2 |
| 8,028,601 B2 * | 10/2011 | Miki ............................ 74/502.2 |
| 8,181,553 B2 * | 5/2012 | Tsumiyama ................ 74/502.2 |
| 2001/0042421 A1 | 11/2001 | Feng et al. | |
| 2002/0033064 A1 | 3/2002 | Ose | |
| 2002/0104401 A1 | 8/2002 | Dal Pra | |

(Continued)

*Primary Examiner* — Vinh Luong
(74) *Attorney, Agent, or Firm* — Richard M. Goldberg

(57) ABSTRACT

A gear shift arrangement for a bicycle that is separate and distinct from a brake lever of the bicycle, in which the bicycle has a derailleur and a derailleur cable associated therewith, includes a single lever adapted to only perform a shifting operation of gears of the bicycle, a housing, a mounting arrangement in the housing for mounting the single lever for movement in a first pivoting direction and for movement in a second substantially linear direction, and a shift control mechanism in the housing for controlling shifting of the gears of the bicycle in a first shifting direction upon movement of the single lever in the first pivoting direction and for controlling shifting of gears of the bicycle in a second, opposite shifting direction upon movement of the single lever in the second substantially linear direction.

17 Claims, 25 Drawing Sheets

(56) References Cited

U.S. PATENT DOCUMENTS

| | | |
|---|---|---|
| 2002/0139637 A1 | 10/2002 | Tsumiyama et al. |
| 2004/0144193 A1 | 7/2004 | Sato et al. |
| 2004/0237696 A1 | 12/2004 | Hilsky et al. |
| 2007/0137385 A1* | 6/2007 | Cesur et al. .................. 74/501.6 |
| 2007/0137388 A1* | 6/2007 | Dal Pra ........................ 74/502.2 |

* cited by examiner

SHIFT LEVER ARRANGEMENT FOR A BICYCLE

REFERENCE TO RELATED APPLICATION

The present application claims priority from U.S. Provisional Application No. 61/216,385, filed May 18, 2009.

BACKGROUND OF THE INVENTION

The present invention relates generally to bicycle shifters, and more particularly, is directed to a shift lever arrangement for a bicycle using a single lever movable along two orthogonal axes for shifting in different directions.

Conventionally, shifters for bicycles have been mounted on the handlebar, separate and apart from the brake levers. Generally, there is single lever that is rotatable in one direction for upshifting and rotatable in the opposite direction for downshifting.

It is, however, to provide different tactile sensations when shifting in the different directions. In this regard, U.S. Pat. No. 5,921,138 to Kojima et al discloses a first lever that is linearly movable for shifting in a first direction and a separate second lever that is pivotally movable in a second different direction for shifting in an opposite direction. However, this requires two different levers, even though the tactile sensations are different.

U.S. Pat. No. 7,527,137 issued May 5, 2009 to the same inventor herein, discloses a single lever that effects a braking operation and a gear shifting operation. A rod moves inside the shift lever in the linear direction, but also requires pivoting movement thereafter of the shift lever, in order to effect a shifting operation. Specifically, to provide a reverse shifting operation, a push button is depressed. As a result, a caroming surface in the shift lever engages a roller wheel to push a plunger rod in the shift lever up against the force of a linear coil spring associated therewith. The flat upper surface of the plunger rod engages the free engagement end of a cable carrier pawl 100. Then, with the push button still depressed, the shift/brake lever is again pivoted about its pivot pin to effect the reverse shifting operation. Thus, this patent requires linear movement of a rod inside of the pivot lever, and also, pivoting movement of the lever thereafter. Further, this arrangement is greatly complicated because it also requires that the single lever be used for a braking operation as well.

The inventor herein has also invented an arrangement which is the subject matter of copending U.S. patent application Ser. No. 11/434,324, filed May 15, 2006 in which a single lever is used for a braking operation as well as gear shifting in both directions. In this invention, the single lever is pivoted in a first direction for performing a braking operation, pivoted in a second direction for performing a first gear shifting operation, and movable only in a linear direction in the longitudinal direction of the shift lever for performing a second opposite gear shifting operation without pivoting of the single lever.

This latter arrangement, however, becomes relatively complicated because of the inclusion of the braking arrangement with the single lever.

It is therefore desirable to provide a single lever that is used for shifting in opposite directions with different tactile sensations, but which is not used for braking.

OBJECTS AND SUMMARY OF THE INVENTION

Accordingly, it is an object of the present invention to provide a shift lever arrangement for a bicycle that overcomes the problems with the aforementioned prior art.

It is another object of the present invention to provide a shift lever arrangement for a bicycle that uses a single lever for shifting in both directions, without providing any braking operation.

It is still another object of the present invention to provide a shift lever arrangement for a bicycle in which the lever moves in pivoting motion for gear switching in one direction, and a linear motion for, gear switching in the opposite direction.

It is yet another object of the present invention to provide a shift lever arrangement for a bicycle that includes a shift control arrangement that uses common elements therein that interact with the shift lever during shifting in both directions.

It is a further object of the present invention to provide a shift lever arrangement for a bicycle that is compact, economical and easy to use.

In accordance with an aspect of the present invention, a gear shift arrangement is provided for a bicycle that is separate and distinct from a brake lever of the bicycle, the bicycle having a derailleur and a derailleur cable associated therewith. The gear shift arrangement includes a single lever adapted to only perform a shifting operation of gears of the bicycle, a housing, a mounting arrangement in the housing for mounting the single lever for movement in a first pivoting direction and for movement in a second substantially linear direction, and a shift control mechanism in the housing for controlling shifting of the gears of the bicycle in a first shifting direction upon movement of the single lever in the first pivoting direction and for controlling shifting of gears of the bicycle in a second, opposite shifting direction upon movement of the single lever in the second substantially linear direction.

The shift control mechanism includes a pulley rotatably mounted in the housing and around which the cable extends, and an actuating arrangement connected between the mounting arrangement and the pulley for controlling rotation of the pulley to either pull or release the cable in dependence upon movement of the shift lever. The pulley includes a plurality of sets of gear teeth therearound, and the actuating arrangement includes a plurality of pawls for engaging the gear teeth in dependence upon movement of the shift lever.

For pulling the cable, the actuating arrangement includes a rotatable element rotatably mounted in the housing and adapted to be rotated from an initial position to a first rotated position by the mounting arrangement upon movement of the single lever in the first pivoting direction. An advance pawl as one of the pawls is pivotally mounted on the rotatable element, and an advance pawl spring biases the advance pawl into engagement with a first the set of gear teeth on the pulley to rotate the pulley to the first rotated position to pull the cable, wherein the advance pawl is configured so that the advance pawl is adapted to engage and rotate the pulley only in a direction to pull the cable.

The actuating arrangement also includes a rotatable element spring for rotationally biasing the rotatable element to the initial position. A main pawl as one of the pawls is pivotally mounted to the housing for holding the pulley in the first rotated position when the shift lever is released and when the rotatable element and the advance pawl are rotated back to the initial position by the rotatable element spring, and a main pawl spring biases the main pawl into engagement with a second the set of gear teeth on the pulley.

The mounting arrangement includes a slide mounted in the housing and connected with the shift lever for substantially linear sliding movement and rotatable movement with the shift lever. There is also a limiting arrangement for preventing the substantially linear sliding movement of the slide upon movement of the single lever in the first pivoting direction.

The slide is adapted to be moved in the housing for substantially linear sliding movement from the initial position to a first linear slid position, upon movement of the single lever in the substantially linear direction. The actuating arrangement further includes a substantially linear biasing arrangement for biasing the slide to the initial position. A hold pawl as one of the pawls is pivotally mounted to the housing for permitting an incremental rotational movement of the pulley, and a pawl biasing arrangement on the slide biases the hold pawl into engagement with a third the set of gear teeth on the pulley upon movement of the single lever in the substantially linear direction to the first linear slid position in order to effect the incremental rotational movement of the pulley.

The pawl biasing arrangement includes a raised abutment that engages an end of the hold pawl upon movement of the single lever and slide in the substantially linear direction to the first linear slid position to bias the hold pawl into engagement with the third the set of gear teeth and to bias the main pawl out of engagement with the second set of gear teeth. The third set of gear teeth have a pitch greater than a width of the hold pawl to permit an incremental rotation of the pulley when the hold pawl is initially engaged therein, in a direction to release the cable. Upon return of the shift lever and slide to the initial position, the hold pawl is no longer biased into engagement with the third set of gear teeth by the pawl biasing arrangement, and the main pawl is biased into engagement by the main pawl spring with the second set of gear teeth to hold the pulley in an incrementally rotated cable release position.

The actuating arrangement also includes a holding arrangement for holding the advance pawl out of engagement with the first gear teeth during movement of the single lever in the substantially linear direction.

There is also a limiting arrangement for preventing rotational movement of the rotatable element upon movement of the single lever in the substantially linear direction.

The above and other objects, features and advantages of the invention will become readily apparent from the following detailed description thereof which is to be read in connection with the accompanying drawings.

DETAILED DESCRIPTION

Figure 1:
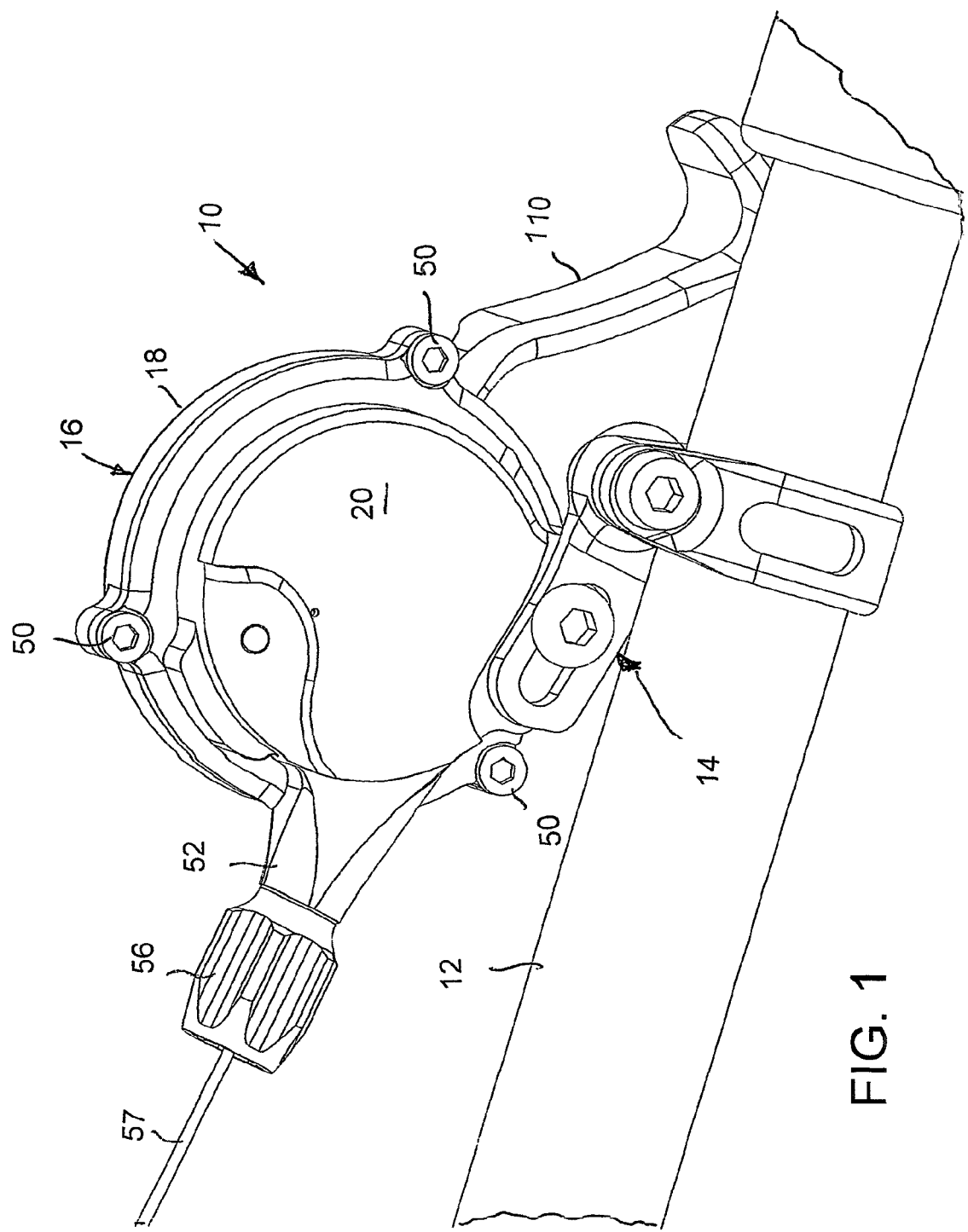
FIG. 1 is a perspective view of one side of the shifter according to the present invention mounted on a handlebar.
Figure 2:
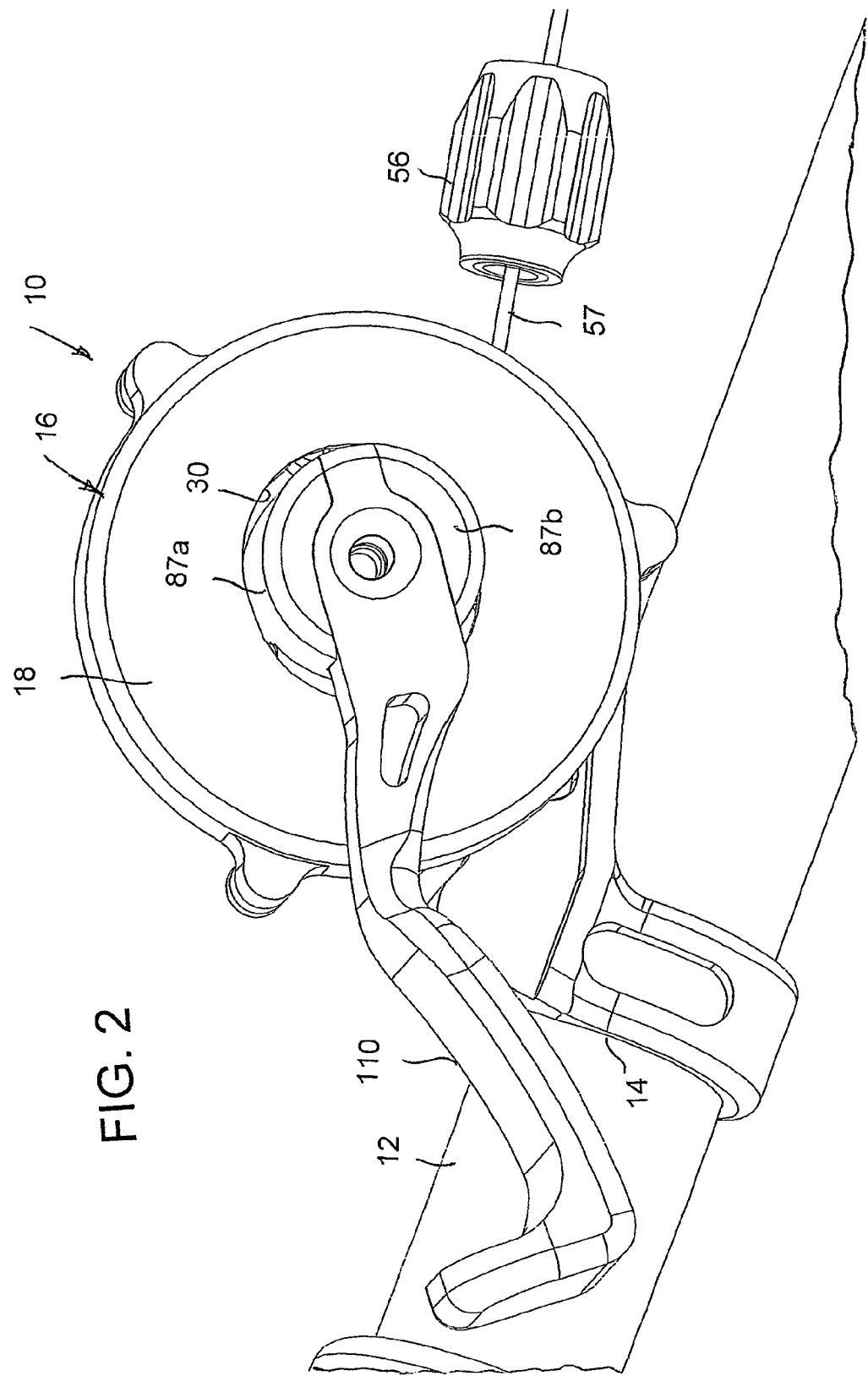
FIG. 2 is a perspective view of the other one side of the shifter according to the present invention mounted on a handlebar.

Referring to the drawings in detail, and initially to FIGS. 1-5, a shift arrangement 10 for a bicycle according to the present invention, includes a housing 16 to be secured to a handlebar 12 of a bicycle by a clamp 14.

For discussion hereafter, reference to an inner facing side or inner facing surface will refer to the side or surface facing the rider, and reference to an outer facing side or outer facing surface will refer to the side or surface facing away from the rider.

Specifically, housing 16 includes a first half housing shell 18 and a second half housing shell 20 secured to first half housing shell 18 so as to encase the assembly for effecting gear shifting.

As shown best in FIGS. 5-8, first half housing shell 18 includes a planar circular outer wall 22 having an annular inturned flange 24 at the periphery thereof. Three equiangularly spaced ears 26 extend outwardly from annular inturned flange 24, each ear 26 having a threaded opening 28 therein facing second half housing shell 20. A central opening 30 is provided in planar outer wall 22, with central opening 30 having a slightly oval or oblong configuration. Two raised stops 32 and 34 extend inwardly from planar outer wall 22 at the edge of central opening 30, with stops 32 and 34 being about 100 degrees apart around central opening 30. An arcuate guide wall 36 is also provided on the inside surface of planar outer wall 22 between stops 32 and 34 and spaced away from central opening 30. A gap 35 is provided between the end of arcuate guide wall 36 and stop 34, the purpose for which will become apparent from the discussion hereafter.

As best shown in FIGS. 5 and 9-14, second half housing shell 20 also includes a planar substantially circular outer wall 40 having an annular inturned flange 42 at the periphery thereof. An annular wall 44 extends outwardly from the periphery of annular inturned flange 42, with three equiangularly spaced ears 46 extending outwardly from annular wall 44. Each ear 46 has a through bore 48 therein. In this regard, bolts 50 (FIG. 1) extend into through bores 48 and are threadedly received in threaded openings 28 to secure second half housing shell 20 to first half housing shell 18, with annular wall 44 seating on inturned flange 24.

Annular inturned flange 42 includes an outwardly extending nose 52 of a generally frusto-conical configuration with a slight taper extending therefrom, and with a central bore 54 extending therethrough in communication with the interior of housing 16. As shown in FIG. 1, nose 52 cooperates with cable adjust collar 56, with the derailleur cable 57 extending through cable adjust collar 56 and nose 52 into the interior of housing 16, as will be explained in greater detail hereafter.

A cylindrical boss 58 extends inwardly from the center of the inner facing surface of circular outer wall 40 and has a substantially trapezoidal shaped upper end 60 with the longer side of substantially trapezoidal shaped upper end 60 being rounded, although the present invention is not limited to this shape. A central opening 61 is provided through cylindrical boss 58 and substantially trapezoidal shaped upper end 60, and smaller offset openings 63 and 65 are provided in substantially trapezoidal shaped upper end 60. A slight depression 62 is formed near the periphery of circular outer wall 40 at the inner facing surface thereof at a position approximately 70 degrees offset from nose 52 in the counterclockwise direction of FIG. 14, with a through opening 64 formed in the center of slight depression 62. A raised projection 66 is formed to one side of depression 62 in the counterclockwise direction of FIG. 14, at the inner facing surface of circular outer wall 40 and at the inner facing surface of annular inturned flange 42, and includes a threaded opening 68 therein. Raised projection 66 includes a triangular shaped projection 70 extending inwardly from annular inturned flange 42. A substantially triangular recess 72 is formed in the inner facing surface of annular inturned flange 42 directly behind slight depression 62, and extends upwardly to annular wall 44. A circular opening 74 extends into the bottom wall of recess 72. A U-shaped recess 76 is formed in the inner facing surface of annular inturned flange 42 to the opposite side of slight depression in the clockwise direction of FIG. 14, and extends the entire height thereof. Lastly, a through opening 78 extends through annular inturned flange 42, substantially diametrically opposite U-shaped recess 76.

Referring now to FIGS. 4, 5 and 15-18, a slide or mounting element 80 as part of a mounting arrangement 79 for the shift lever to be discussed hereafter, is slidably mounted to planar circular outer wall 22 of first half housing shell 18. Specifically, slide 80 includes a circular disc 82 having a circular boss 84 extending from the center of the outer facing surface of circular disc 82. Boss 84 is cut away to define a slightly raised pedestal 86 and raised walls 87a and 87b extending upwardly therefrom with a generally outer circular footprint. Raised walls 87a and 87b define a large rectangular open area 88 between raised walls 87a and 87b, which is in communication with a small rectangular open area 90 between raised walls 87a and 87b through an intermediary curved open area 92 between raised walls 87a and 87b, all above slightly raised pedestal 86. A central threaded opening 94 is provided on the outer facing surface of circular disc 82 at the center thereof. A cylindrical projection 96 is provided on the outer facing surface of circular disc 82, adjacent to small rectangular open area 90 and at a lower height than slightly raised pedestal 86. An annular advance roller 97 (FIG. 17) is rotatably mounted on cylindrical projection 96, and is adapted to fit through gap 35.

The opposite inner facing surface of slide 80 includes an elongated recess 98 having a flat end 100 at one end thereof and extends in the same lengthwise direction as large rectangular open area 88 and centered therewith. A triangular recess 102 is provided to one side of elongated recess 98 and includes a guide wall 103 as will be discussed in greater detail hereafter. A further recess 104 is provided on the opposite side of elongated recess 98 for the purpose of reducing material. In addition, a slightly arcuate raised wall 106 extends upwardly from the inner facing surface of slide 80 at a position generally inline with elongated recess 98 but near the opposite periphery of circular disc 82. A further slightly arcuate raised wall 108 of lesser dimensions than slightly arcuate raised wall 106 extends upwardly from one outer circumferential corner of slightly arcuate raised wall 106.

Slide 80 is slidably mounted to planar circular outer wall 22 of first half housing shell 18 such that the outer facing surface of slide 80 rests against the inner facing surface of first half housing shell 18 and such that raised walls 87a and 87b extend through central opening 30.

Figure 5:
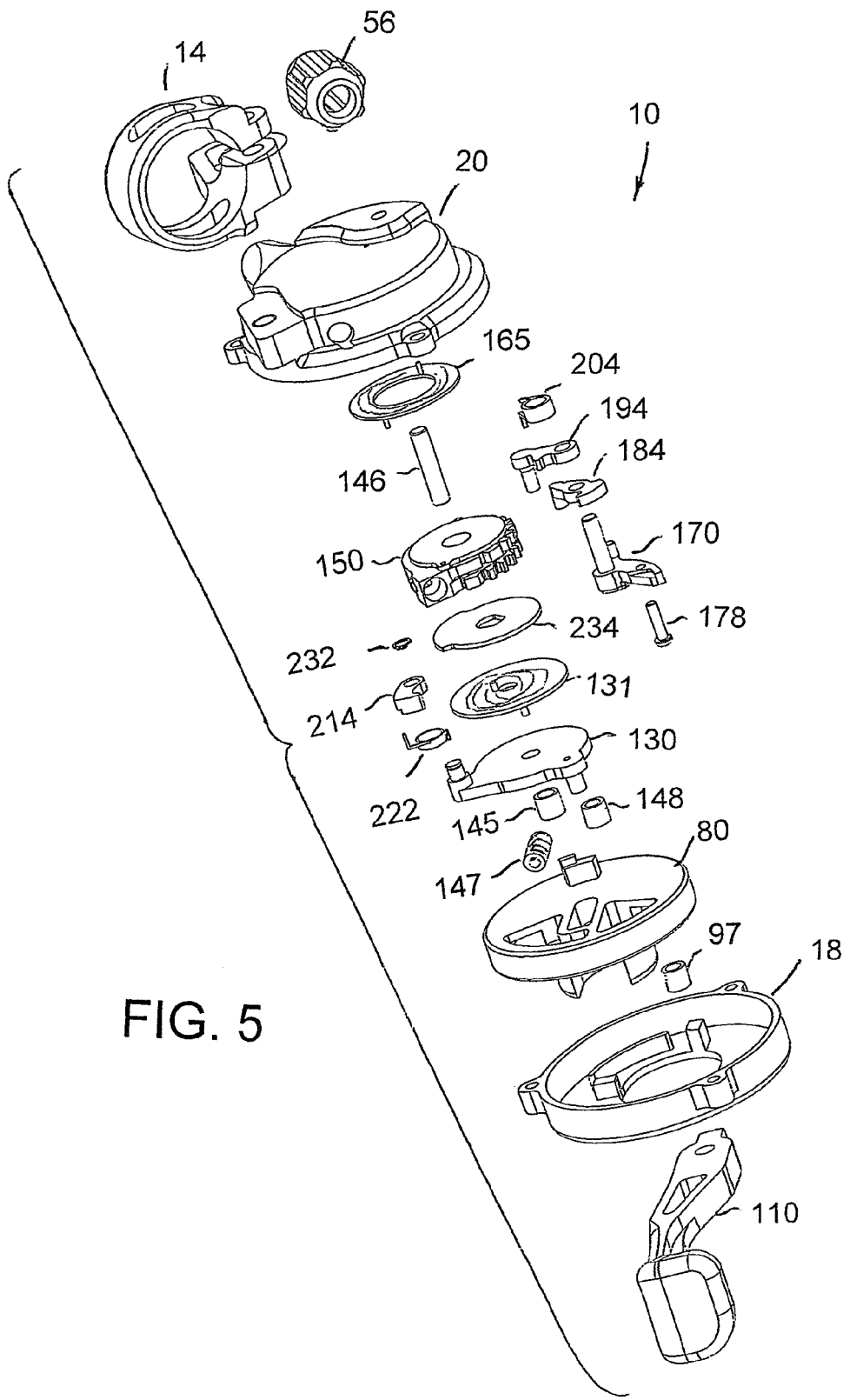
FIG. 5 is an exploded view of the shifter according to the present invention.
Figure 6:
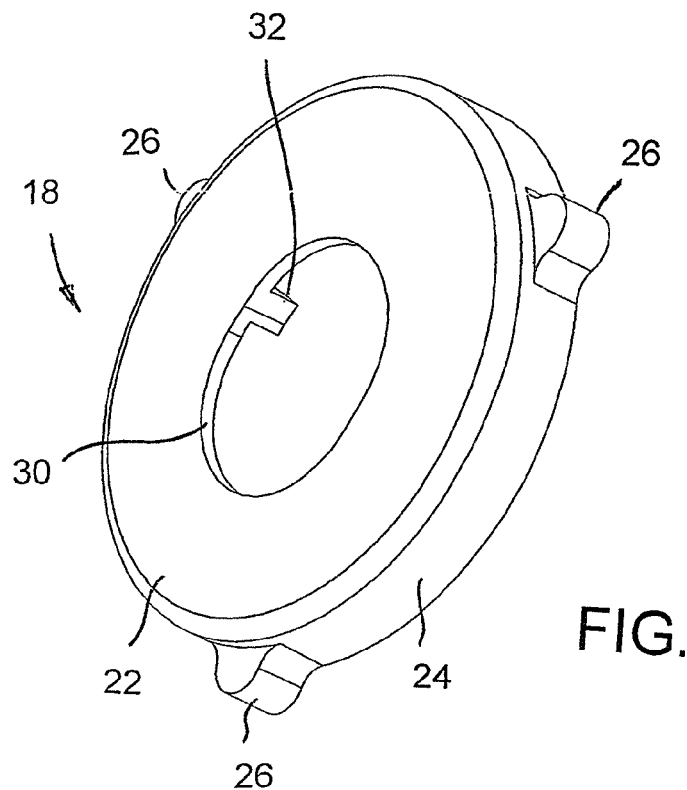
FIG. 6 is an outer perspective view of the first half housing shell.
Figure 7:
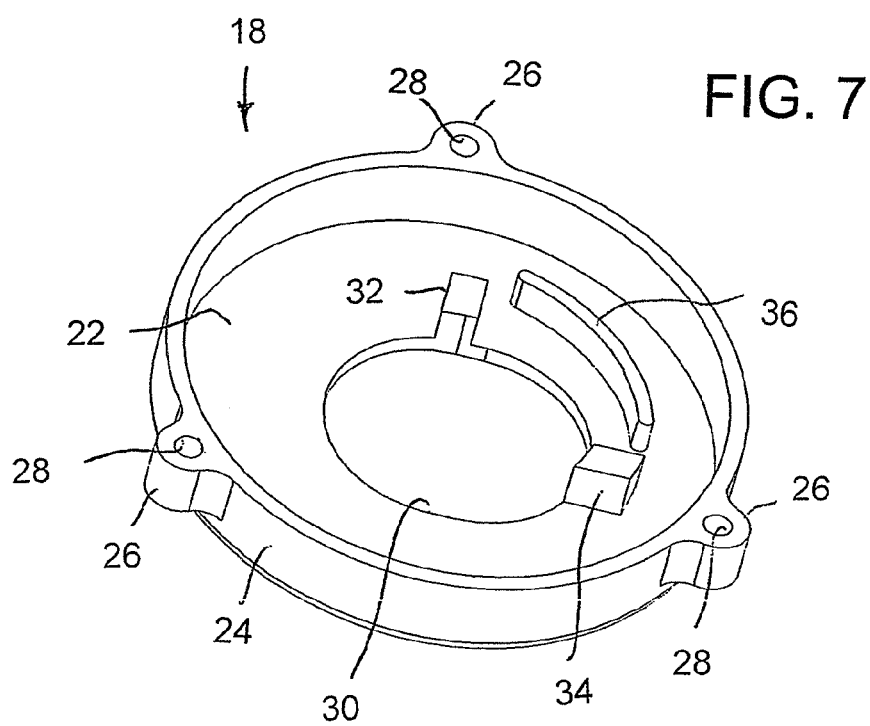
FIG. 7 is an inner perspective view of the first half housing shell.
Figure 8:
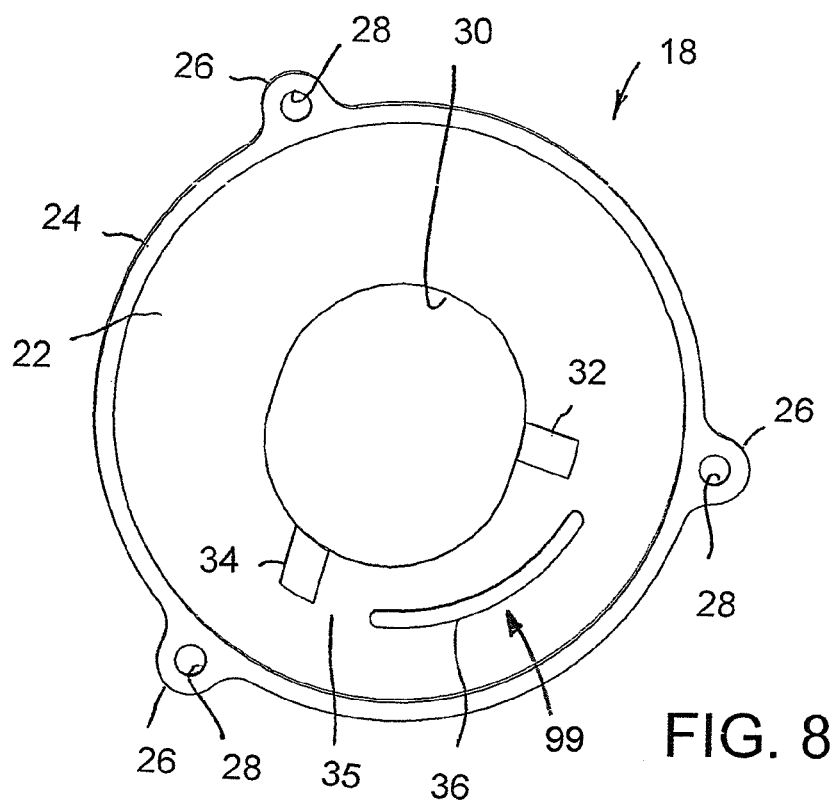
FIG. 8 is an inner plan view of the first half housing shell.
Figure 9:
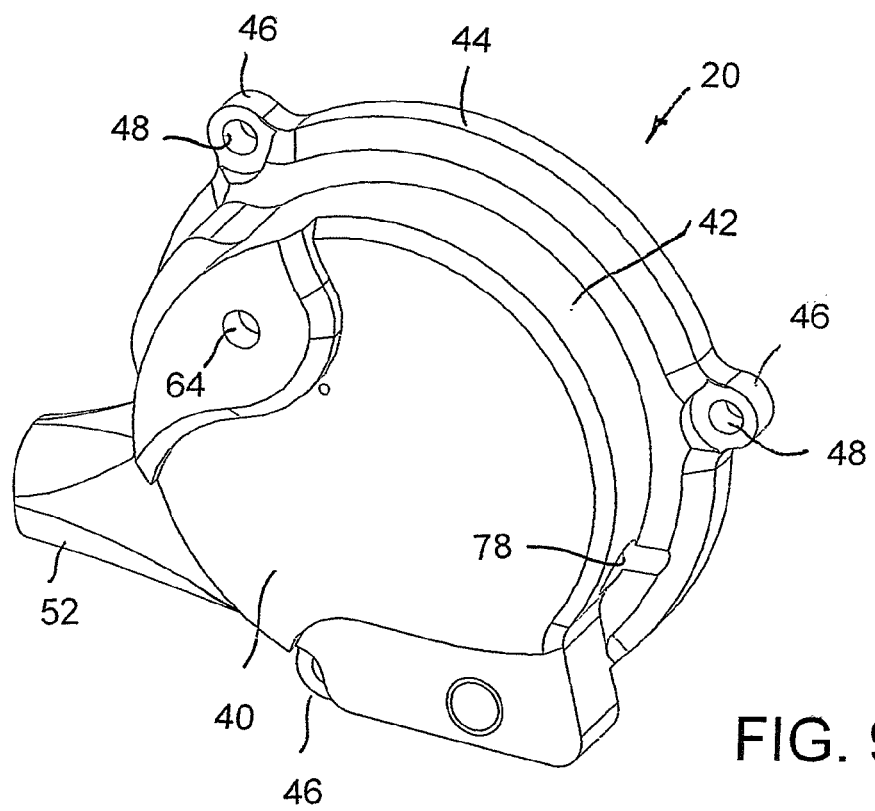
FIG. 9 is a top outer perspective view of the second half housing shell.
Figure 10:
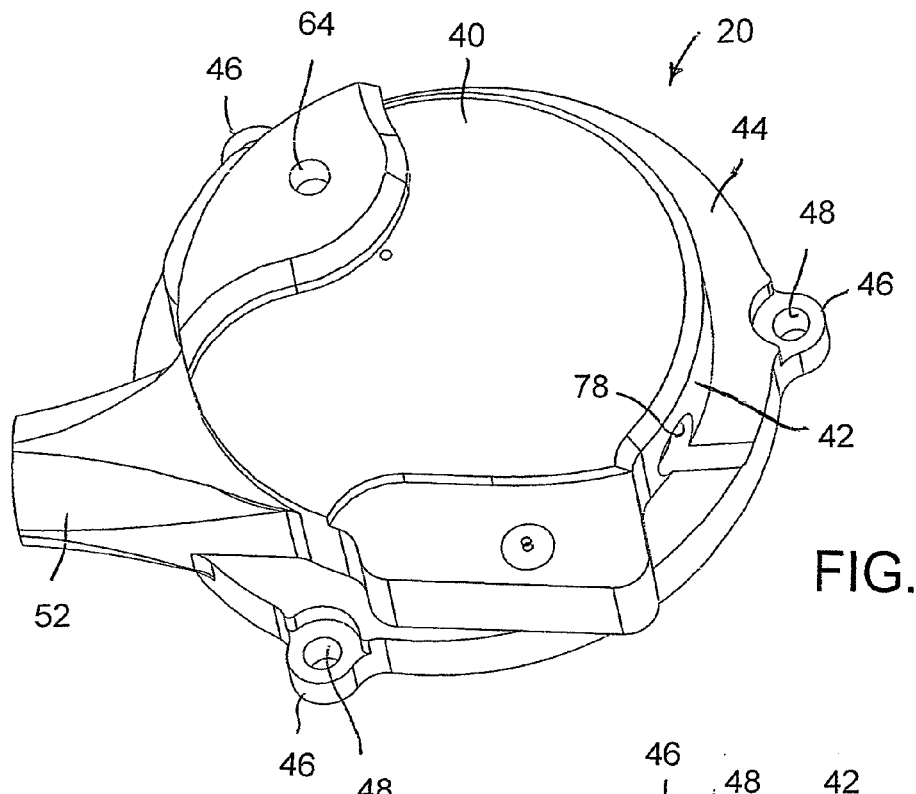
FIG. 10 is a bottom outer perspective view of the second half housing shell.
Figure 11:
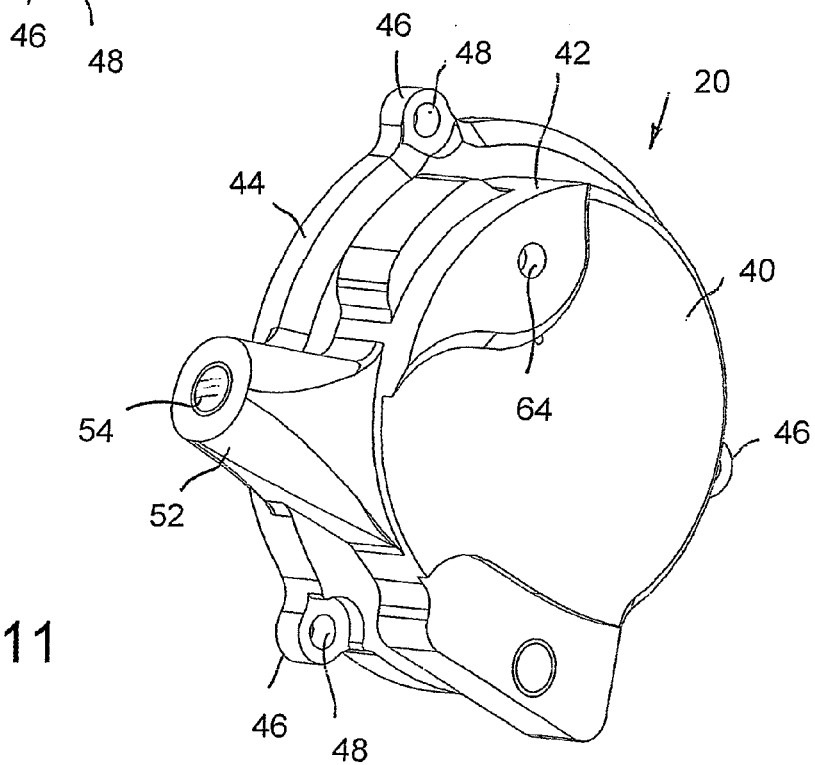
FIG. 11 is a left side outer perspective view of the second half housing shell.
Figure 12:
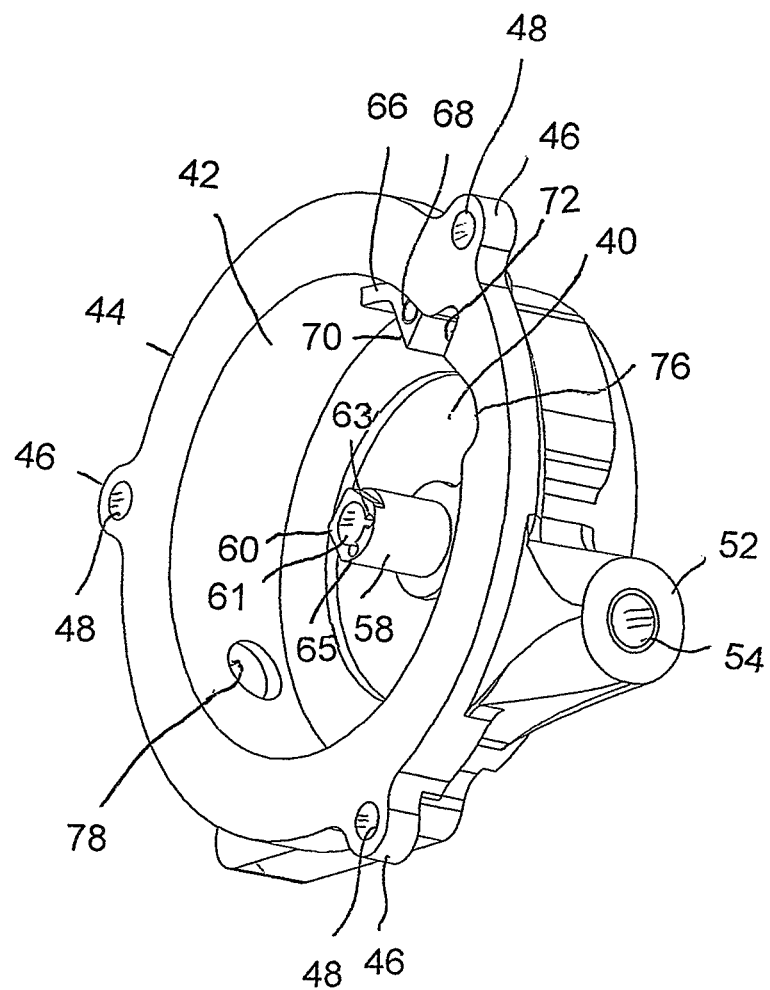
FIG. 12 is a left side inner perspective view of the second half housing shell.
Figure 13:
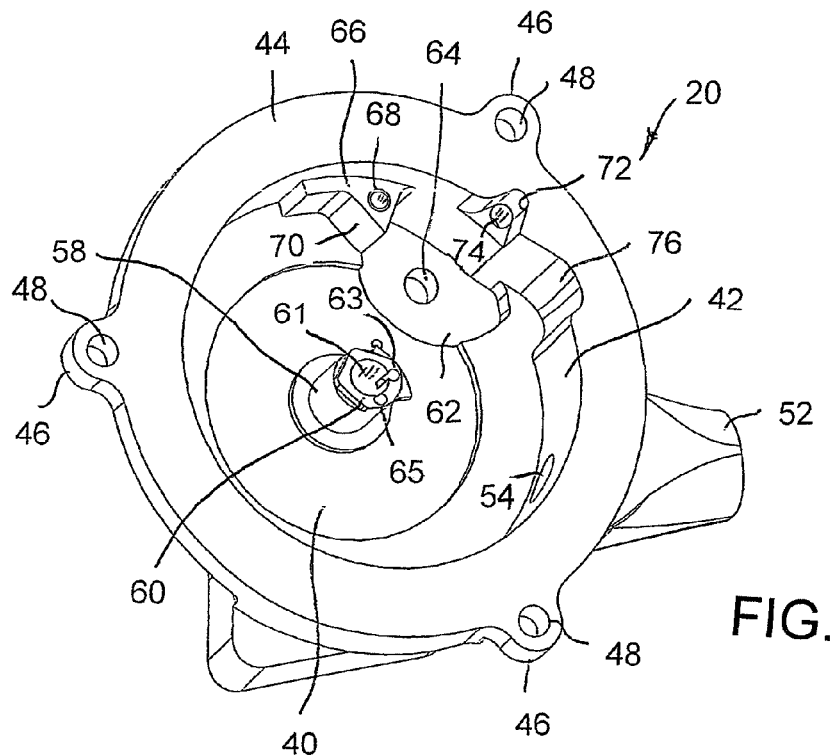
FIG. 13 is a right side inner perspective view of the second half housing shell.
Figure 14:
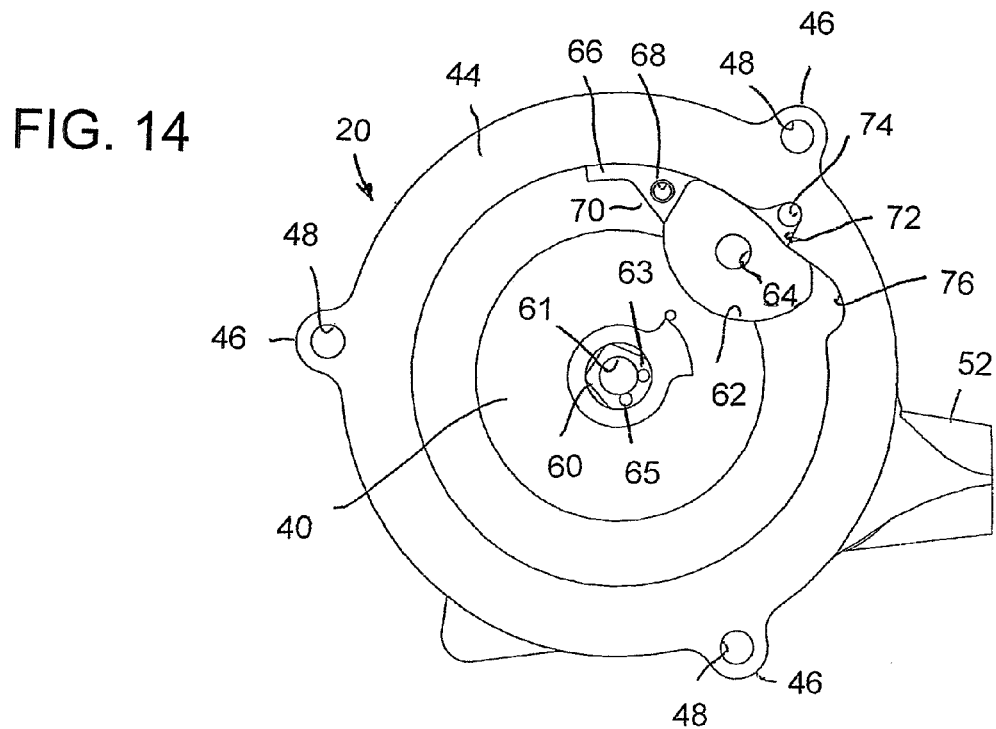
FIG. 14 is a plan view of the inner facing side of the second half housing shell.
Figure 15:
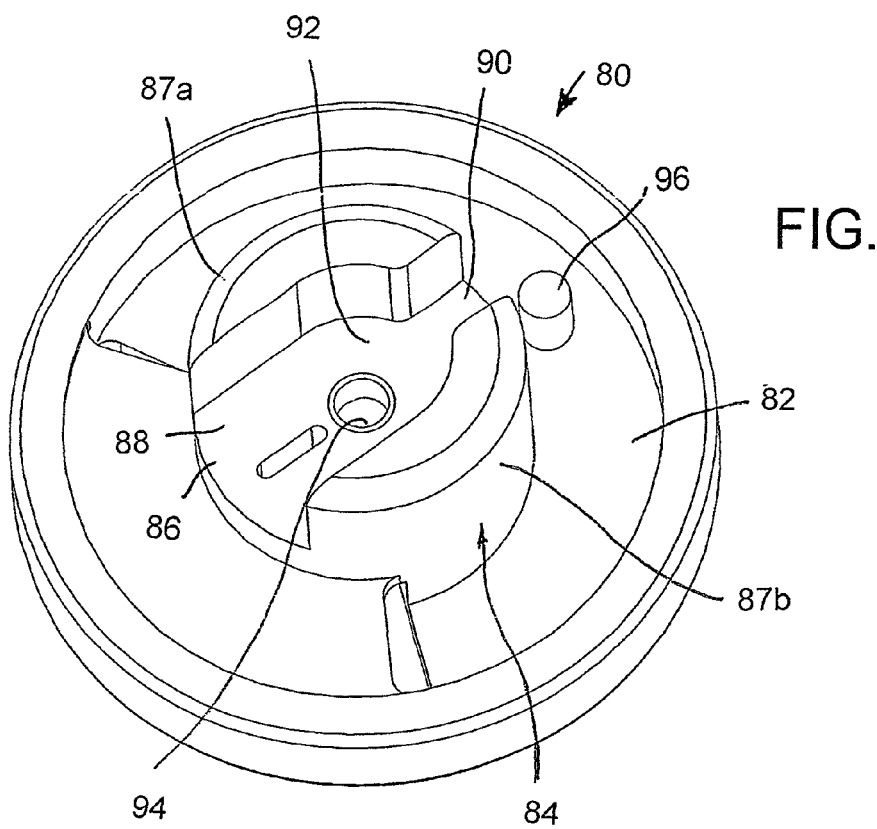
FIG. 15 is an outside perspective view of the slide.
Figure 16:
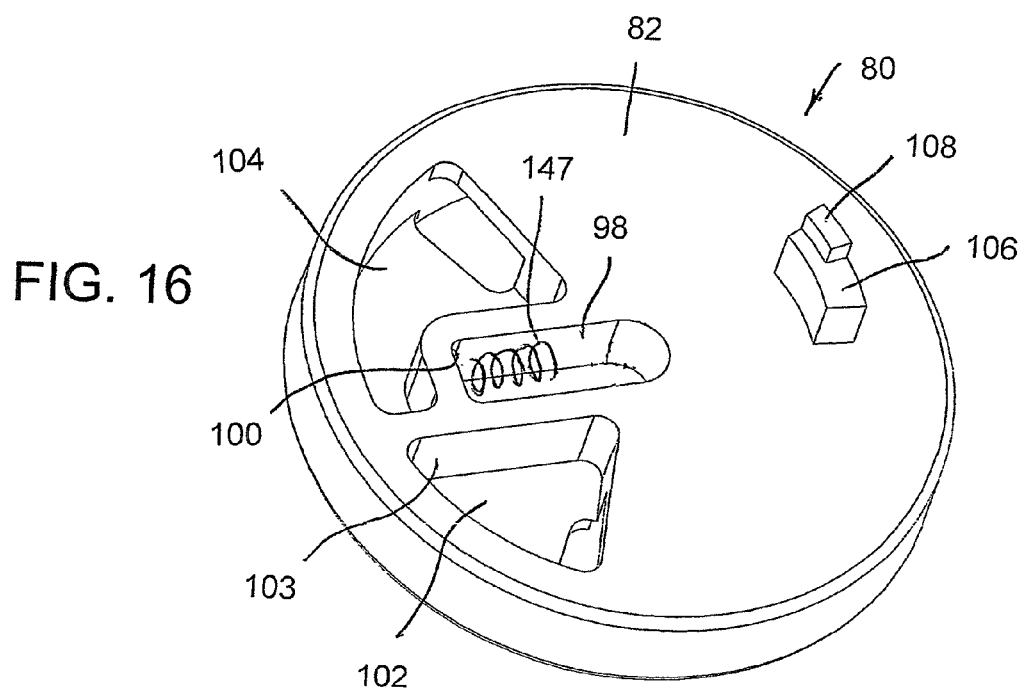
FIG. 16 is an inside perspective view of the slide.
Figure 17:
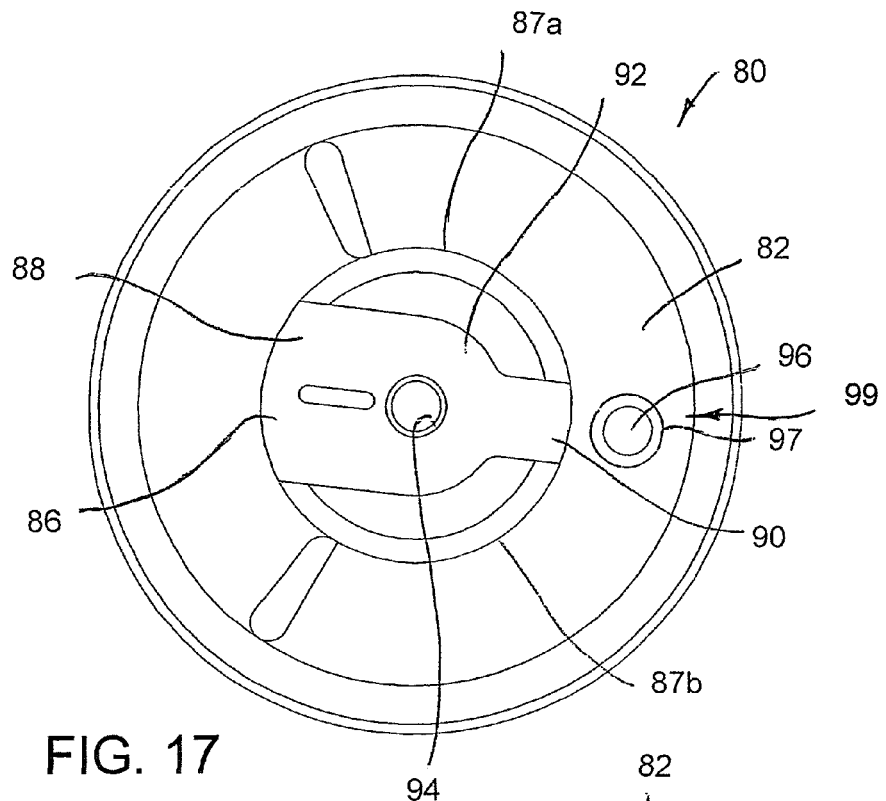
FIG. 17 is an outside plan view of FIG. 13.
Figure 18:
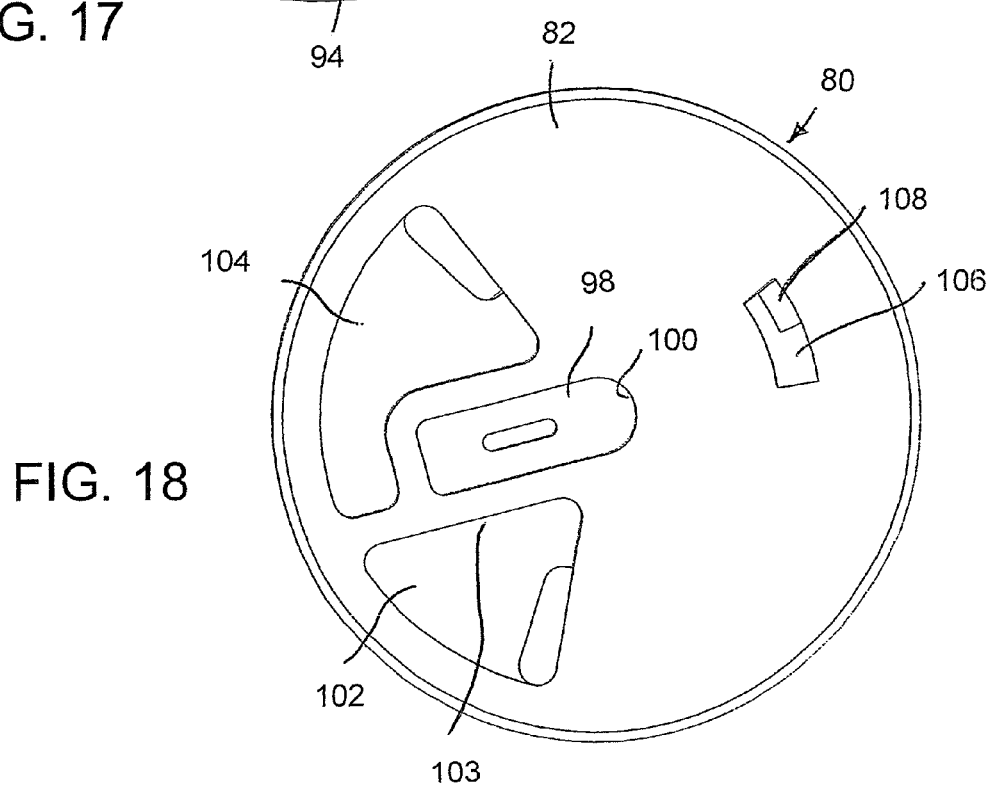
FIG. 18 is an inside plan view of FIG. 14.
Figure 19:
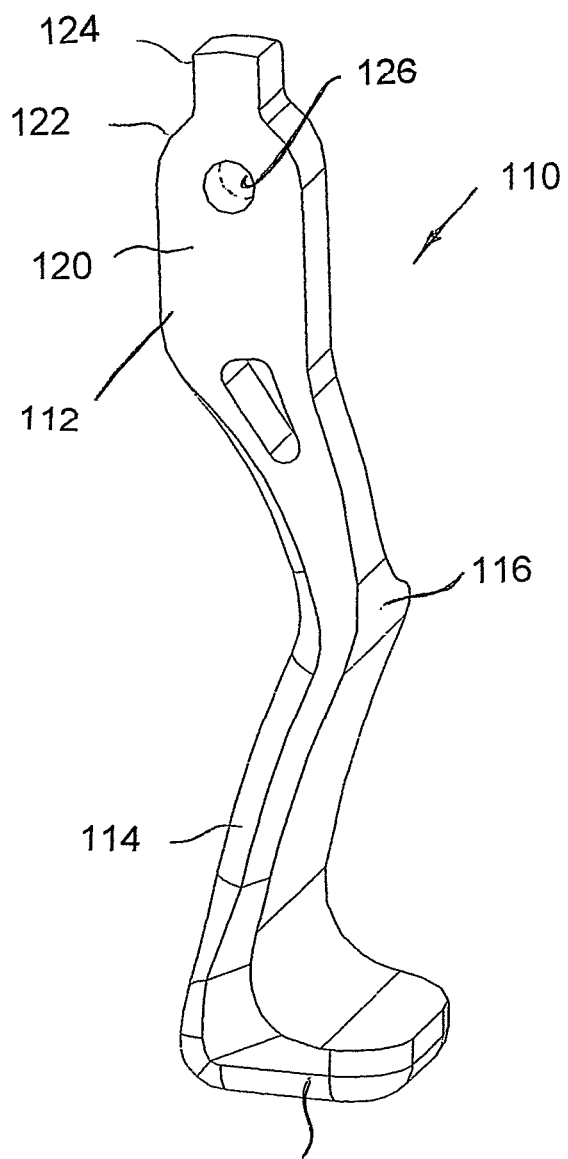
FIG. 19 is a perspective view of the shift lever.

A shift lever 110, as shown in FIGS. 5 and 19, is attached to the outer facing surface of slide 80, to the outside of first half housing shell 18. Specifically, lever 110 has a generally human leg shaped appearance, with an upper leg section 112 connected to a lower leg section 114 at an angle of about 140 degrees through a knee section 116, with the free end of lower leg section 114 including a foot 118 extending approximately at a right angle from lower leg section 114. Upper leg section 112 includes a main body 120 having dimensions corresponding to the dimensions of large rectangular open area 88 of slide 80 and fits therein. The free end of upper leg section 112 tapers down through an arcuate reducing section 122 to a reduced dimension rectangular parallelepiped section 124. Arcuate reducing section 122 has dimensions corresponding to the dimensions of intermediary curved open area 92 of slide 80 and fits therein, and rectangular parallelepiped section 124 has dimensions corresponding to small rectangular open area 90 and fits thereon. In this position, a through bore 126 in main body 120 is in coaxial alignment with central opening 94 of slide 80. A rivet, bolt or the like (not shown) extends through bore 126 and central opening 94 to fixedly secure shift lever 110 to slide 80.

Figure 42:
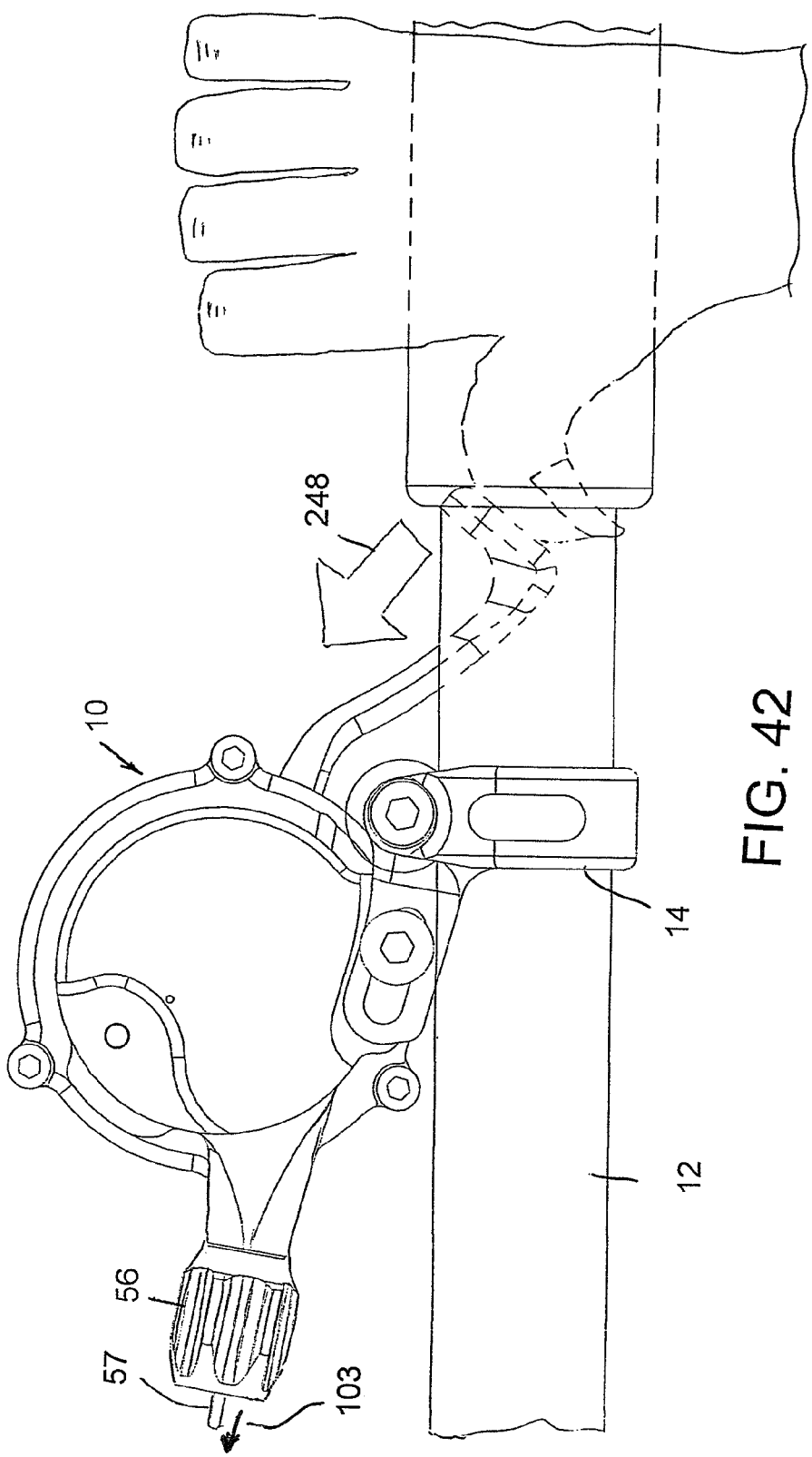
FIG. 42 is a perspective view of the shifter according to the present invention during a gear shifting operation in a first direction.

It will therefore be appreciated that rotation of shift lever 110 around the axis of through bore 126 results in corresponding rotation of slide 80 relative to first half housing shell 18. In addition, since raised walls 87a and 87b have a generally outer circular footprint, and since central opening 30 of first half housing shell 18 has a slightly oval or oblong configuration, raised walls 87a and 87b can slide within central opening 30. Thus, when shift lever 110 is pushed by the user in an axial direction thereof, from the outer surface of foot 118, as shown in FIG. 42, raised walls 87a and 87b slide within central opening 30.

Figure 20:
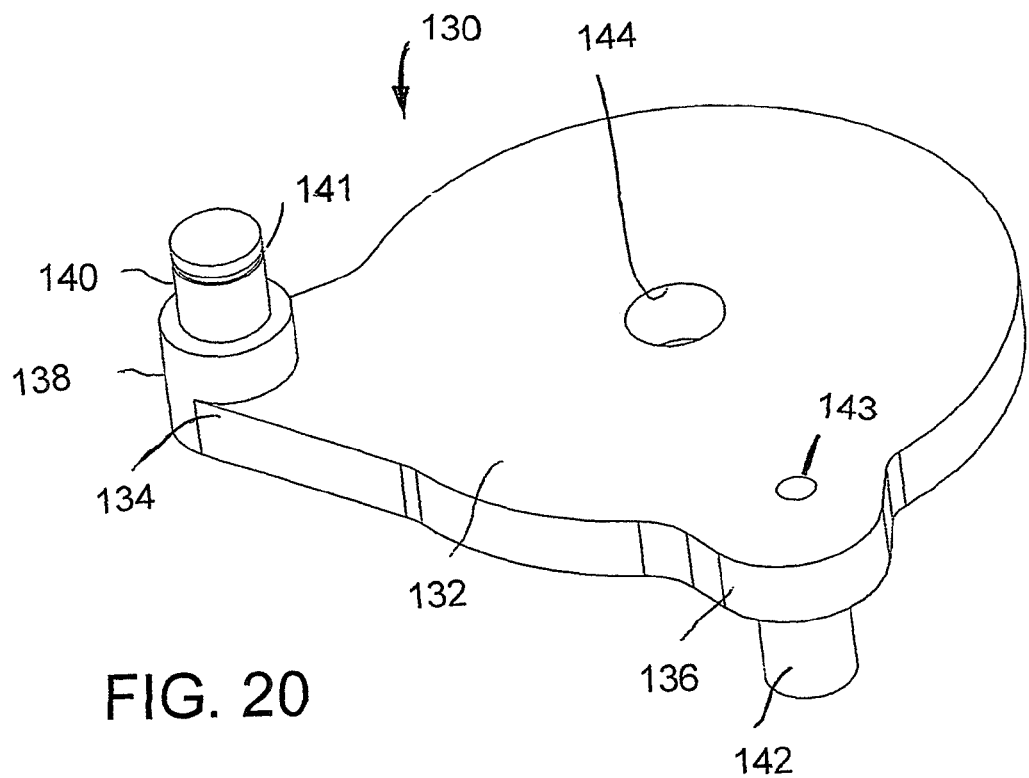
FIG. 20 is a perspective view of the inner facing side of the post sleeve.
Figure 21:
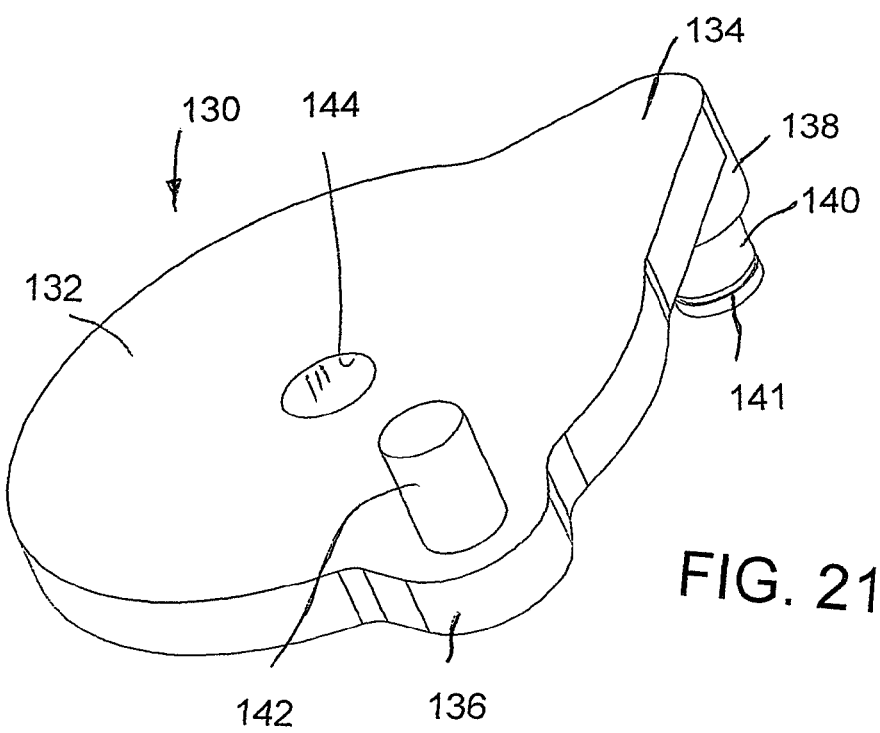
FIG. 21 is a perspective view of the outer facing side of the post sleeve.

Referring now to FIGS. 5, 20 and 21, a post sleeve 130 as a rotatable element of an actuating arrangement is provided in the housing 16 against the inner facing surface of slide 80. Specifically, post sleeve 130 includes a thin generally circular plate 132 having two ears 134 and 136 extending outwardly in the plane of plate 132 and separated by an angle of about 100 degrees. A boss 138 is provided at the outer end of one ear 134 and has a post 140 extending therefrom at right angles to the plane of plate 132, while a post 142 extends from the other ear 136 on the opposite side of plate 132. An annular groove 141 is provided around post 140 near the free end thereof. A small opening 143 is provided on the opposite surface of ear 136. In addition, plate 132 includes a central through bore 144.

A center shaft 146 as part of the mounting arrangement 79 is fixed in central opening 61 of cylindrical boss 58 and extends through bore 144. The free end of center shaft 146 has a post sleeve roller 145 (FIG. 4) thereon which slidably fits within elongated recess 98 and which permits center shaft 146 to rotate therein. A compression spring 147 (FIGS. 4 and 16) or other suitable spring member is fit within elongated recess 98 between flat end 100 thereof and post sleeve roller 145 to normally bias post sleeve roller 145 away from flat end 100.

Post sleeve 130 is rotatably mounted on center shaft 146 such that post 142 extends within triangular recess 102 of slide 80. An annular advance roller 148 is rotatably mounted on post 142 and is adapted to be guided along guide wall 103 of slide 80, as will be discussed hereafter, during sliding movement of raised walls 87a and 87b within central opening 30. Advance roller 148 is shown disengaged from post 142 in FIG. 3 merely for better illustration purposes.

Figure 22:
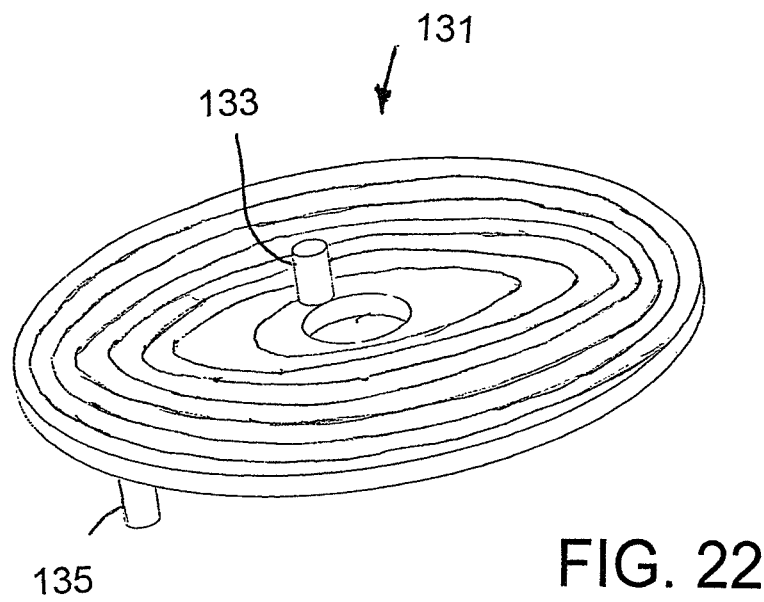
FIG. 22 is a perspective view of the shift lever return spring.
Figure 23:
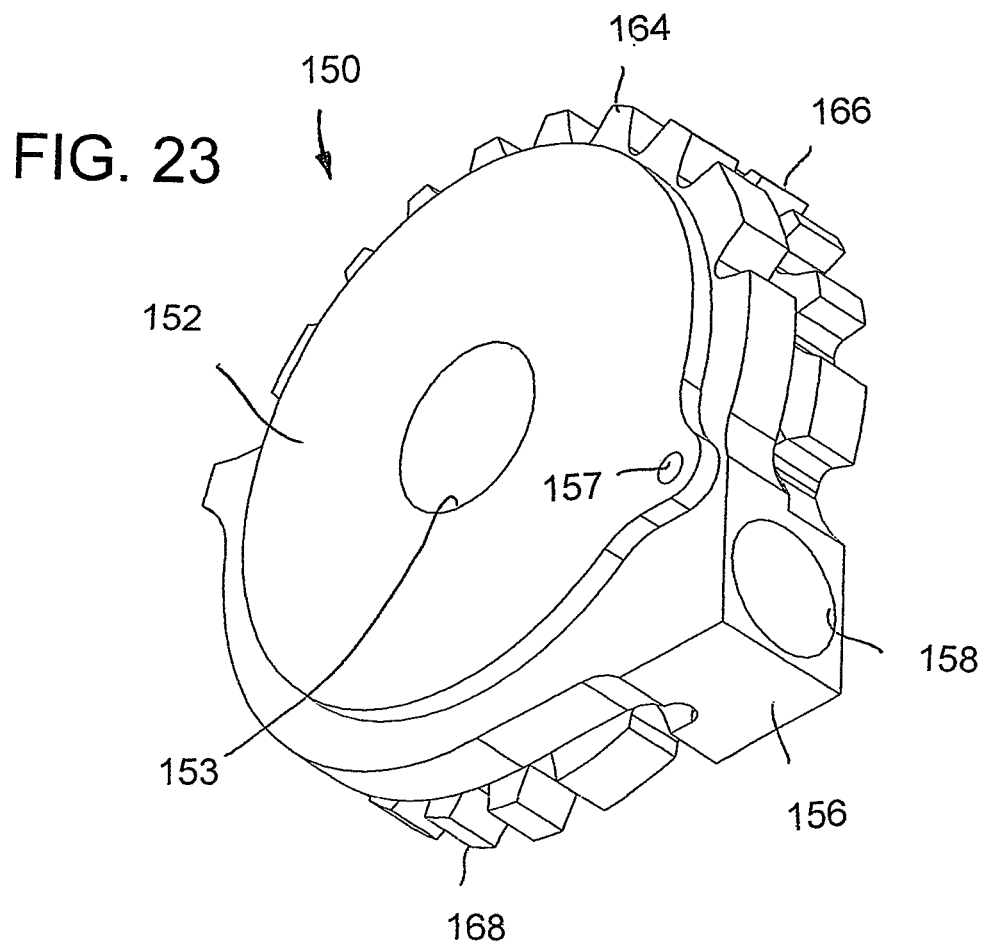
FIG. 23 is a perspective view of the inner facing side of the triple gear pulley.
Figure 24:
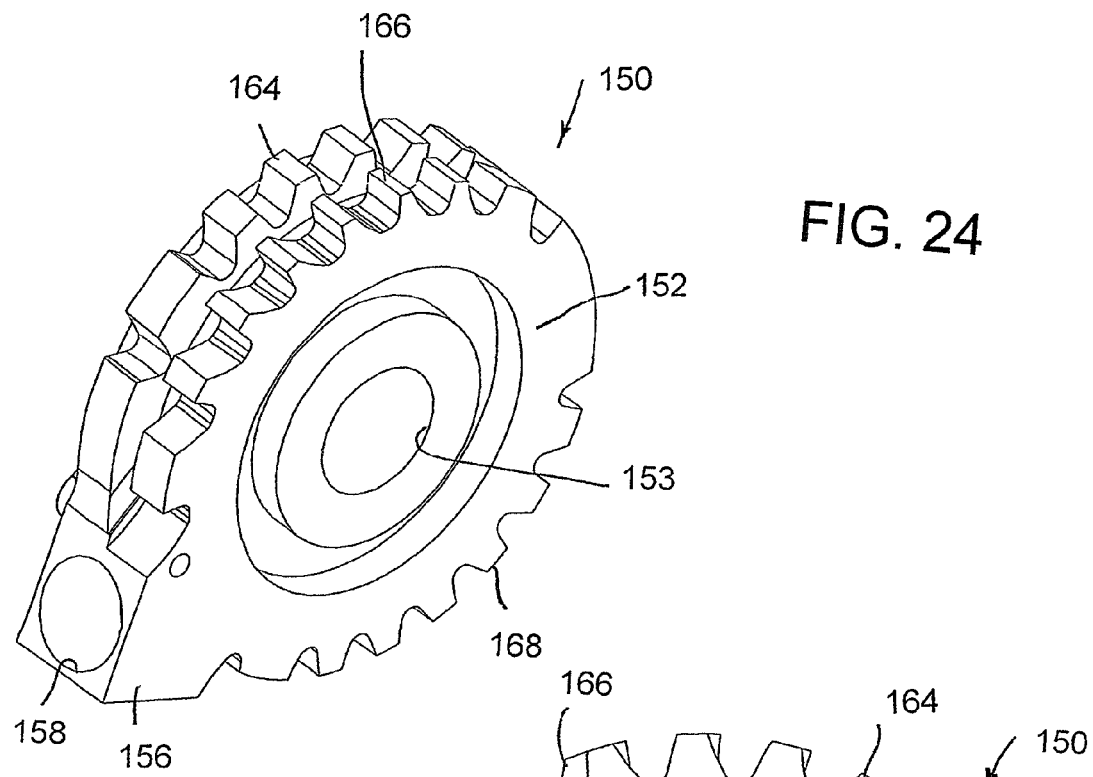
FIG. 24 is a perspective view of the outer facing side of the triple gear pulley.
Figure 25:
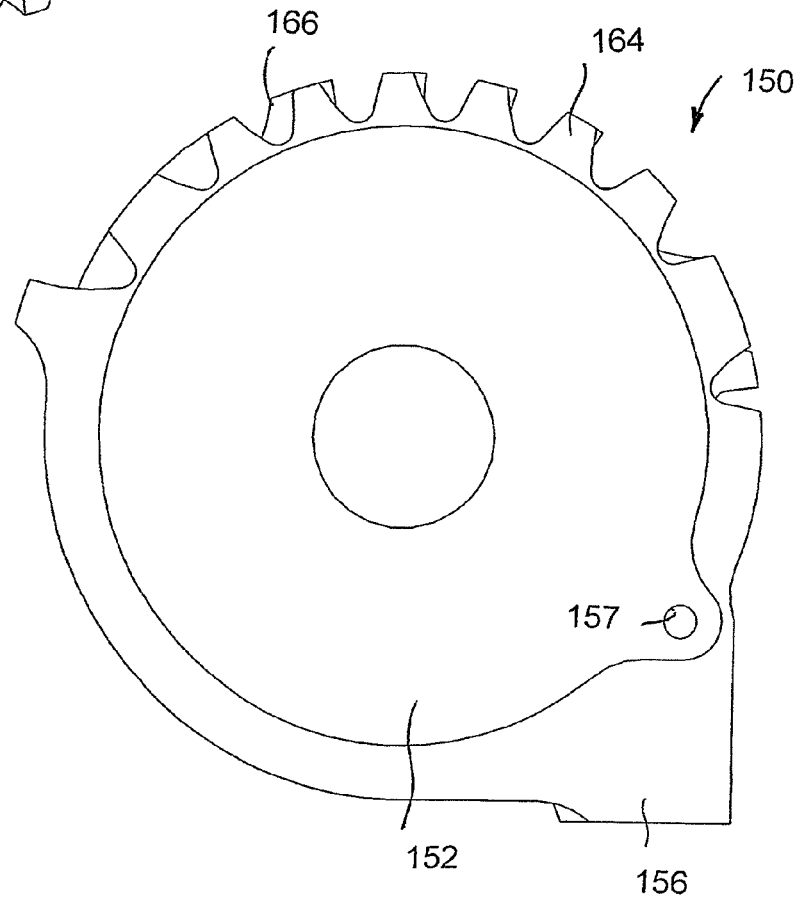
FIG. 25 is an elevational view of the inner facing side of the triple gear pulley.
Figure 26:
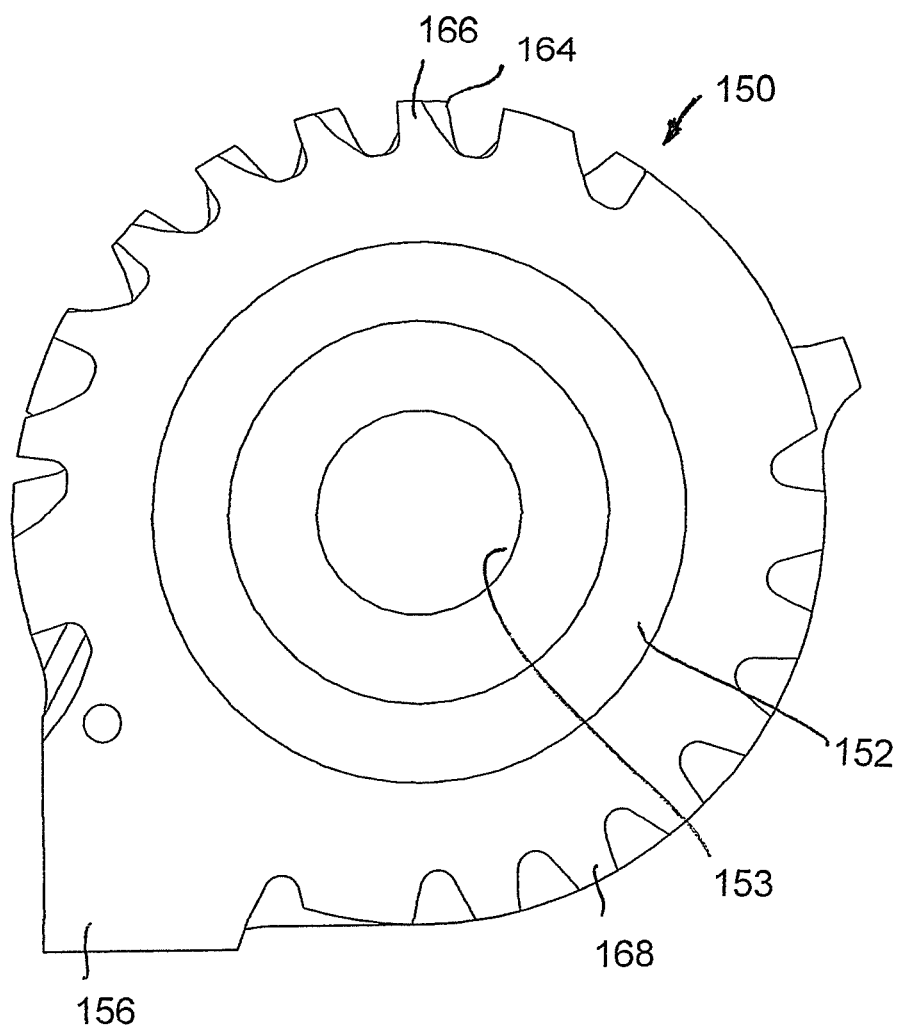
FIG. 26 is an elevational view of the outer facing side of the triple gear pulley.
Figure 27:
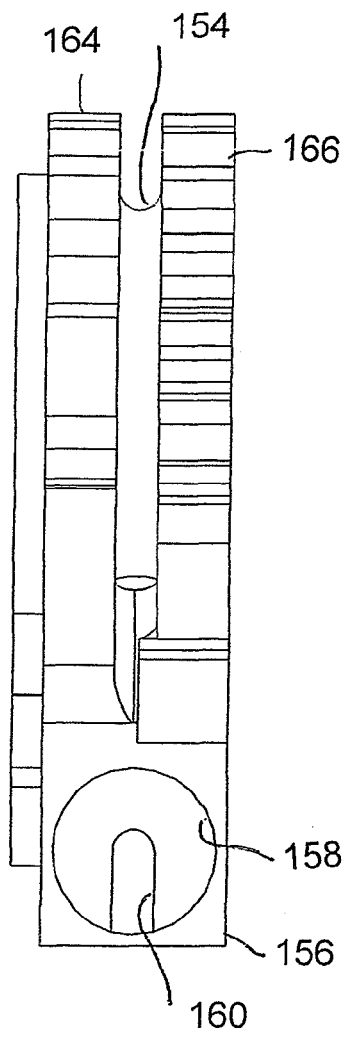
FIG. 27 is an elevational view of the right side of the triple gear pulley.
Figure 28:
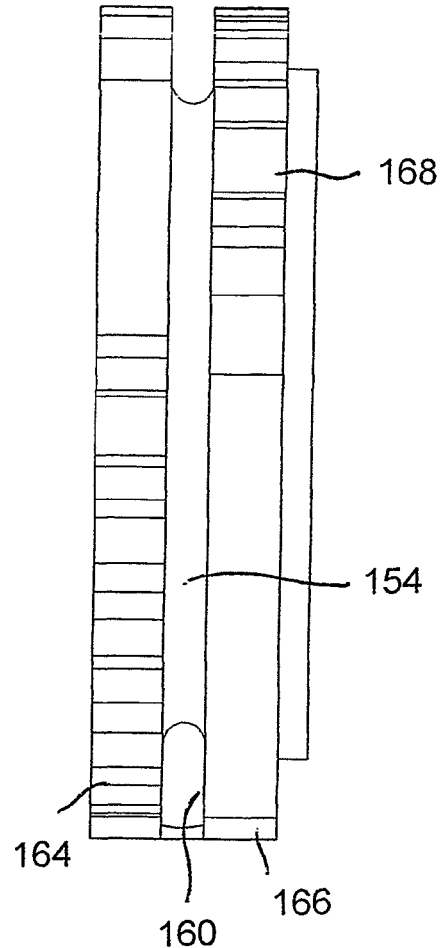
FIG. 28 is an elevational view of the left side of the triple gear pulley.

As shown in FIGS. 5 and 22, a coiled torsion shift lever return spring 131 is mounted against the inner facing surface of post sleeve 130. The inner end of shift lever return spring 131 is bent to form a bent spring projection 133 that is fixed in offset opening 63, while the outer end of shift lever return spring 131 is bent to form a bent spring projection 135 that is fixed in small opening 143 provided in ear 136 of post sleeve 130. In this manner, shift lever return spring 131 functions to normally bias post sleeve 130 in the clockwise direction of FIG. 3. As a result, annular roller 148 mounted on post 142 functions to rotate slide 80 and shift lever 110 therewith.

As shown best in FIGS. 3, 5 and 23-28, a triple gear pulley 150 is rotatably mounted on cylindrical boss 58 of second half housing shell 20 at the inner facing surface of shift lever return spring 131. Triple gear pulley 150 includes a generally cylindrical body 152 having a central through bore 153 through which cylindrical boss 58 extends. Cylindrical body 152 has a centrally located annular cable guiding groove 154 around the outer circumference thereof around which derailleur cable 57 extends. A pointed triangular nose 156 extends outwardly from the outer periphery of cylindrical body 152 and intersects with cable guiding groove 154. Triangular nose 156 includes a cylindrical recess 158 at one side which extends partly therethrough, and an elongated slot 160 at the opposite side which extends into open communication with cylindrical recess 158. Triangular nose 156, as shown in FIG. 4, is normally oriented in a lower position to the right side thereof. In this manner, cable 57 enters housing 16 and extends within cable guiding groove 154 from a position slightly to the left of triangular nose 156, and through elongated slot 160 and cylindrical recess 158. A cylindrical plug 162 (FIG. 4) is fixed to the free end of cable 57 that extends through cylindrical recess 158, and is fit within cylindrical recess 158 so as to secure the free end of cable 57 to triple gear pulley 150 at pointed triangular nose 156. A small opening 157 is provided in the inner facing surface adjacent triangular nose 156.

It will be appreciated that cable guiding groove 154 divides the outer circumference of triple gear pulley 150 into an inner circumferential section and an outer circumferential section. A first set of inner gear teeth 164 extend from the inner circumferential section and a second set of outer gear teeth 166 extend from the outer circumferential section, respectively, both starting from a position immediately above triangular nose 156 and extending upwardly and around triple gear pulley 150 to a position approximately diametrically opposite to triangular nose 156. It will be appreciated that inner gear teeth 164 have a generally symmetrical trapezoidal appearance, while outer gear teeth 166 each have the same inclination in a direction toward triangular nose 156 and have a greater pitch than gear teeth 164. As a result, and as will be appreciated from the discussion hereafter, gear teeth 166 are slightly offset from gear teeth 164. A third set of outer gear teeth 168 extend around the outer circumferential section from a position slightly spaced from the end of the second set of outer gear teeth 166 to a position adjacent to the opposite side of triangular nose 156. Gear teeth 168 have a generally symmetrical trapezoidal appearance.

Figure 29:
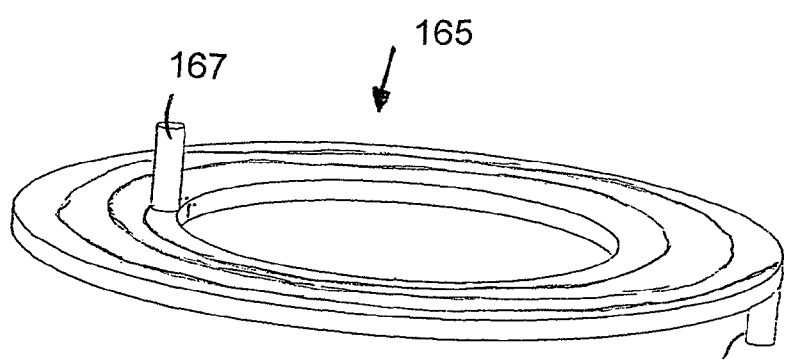
FIG. 29 is a perspective view of the gear return spring.
Figure 30:
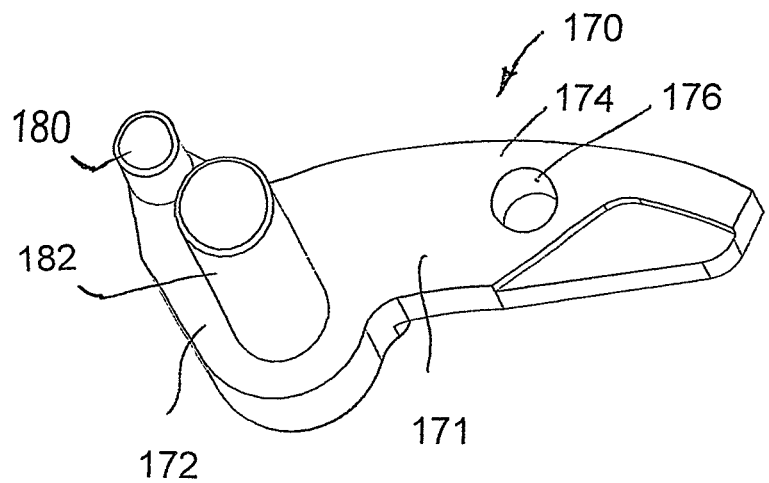
FIG. 30 is a perspective view of the inner facing side of the pawl flange.
Figure 31:
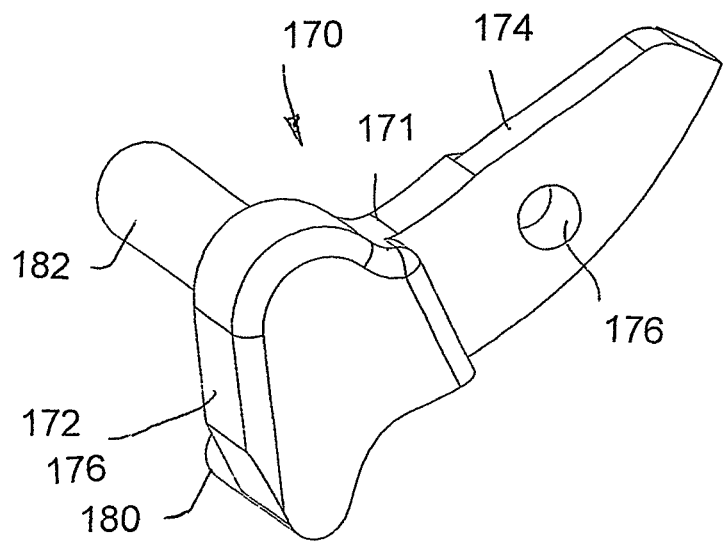
FIG. 31 is a perspective view of the outer facing side of the pawl flange.
Figure 32:
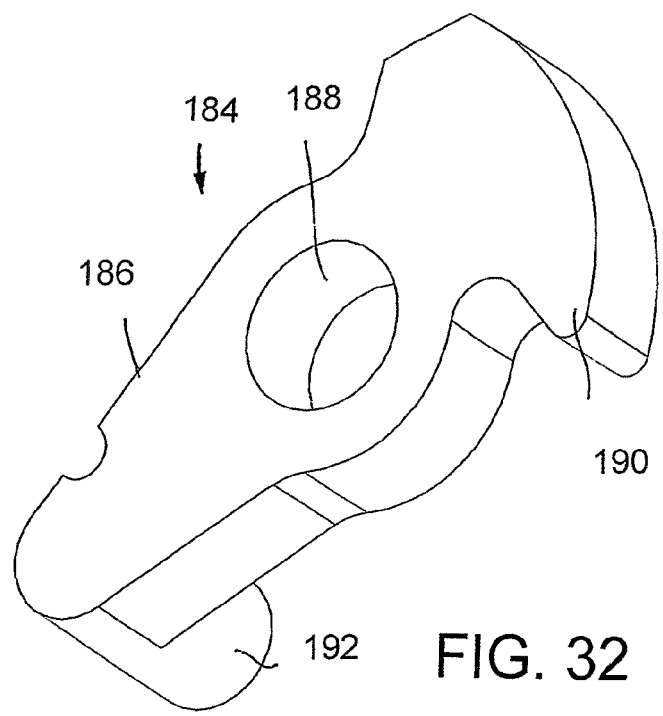
FIG. 32 is a perspective view of the inner facing side of the hold pawl.
Figure 33:
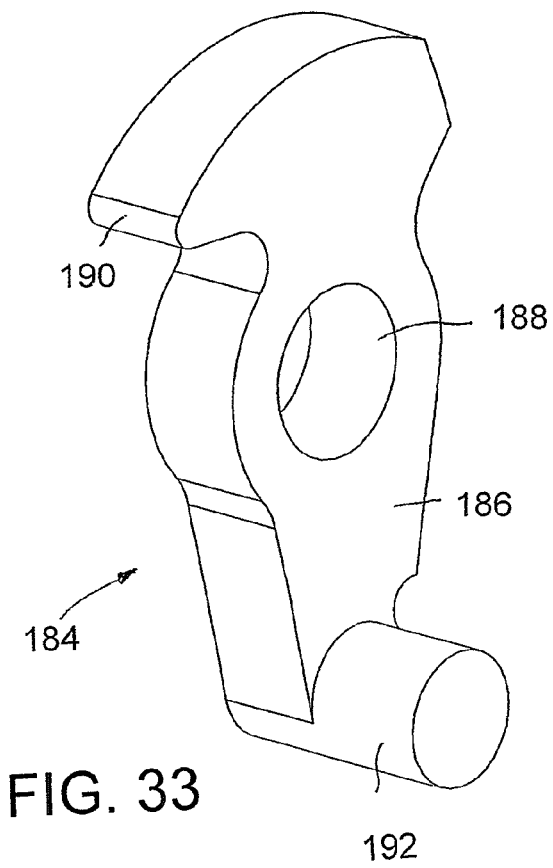
FIG. 33 is a perspective view of the outer facing side of the hold pawl.
Figure 34:
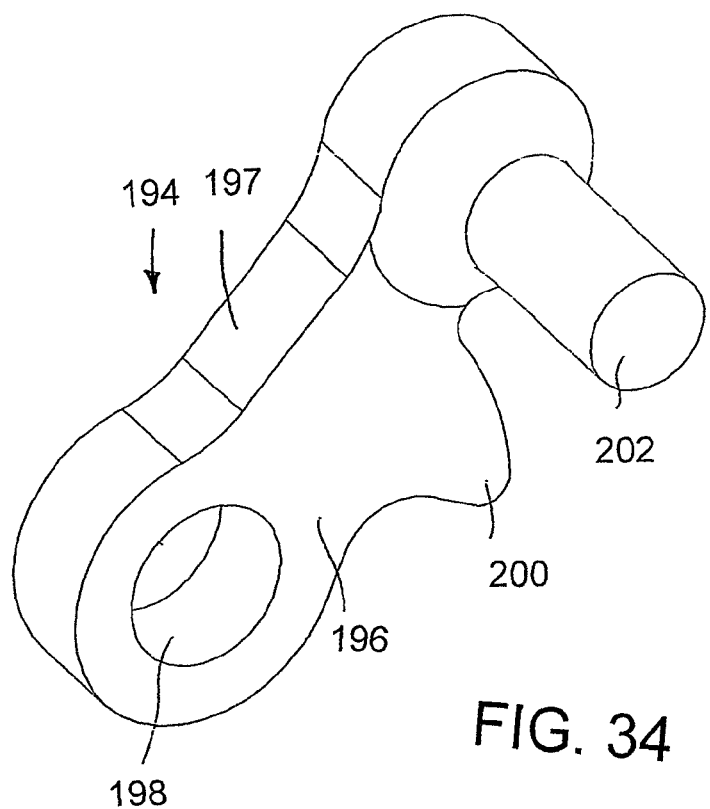
FIG. 34 is a perspective view of the main pawl.
Figure 35:
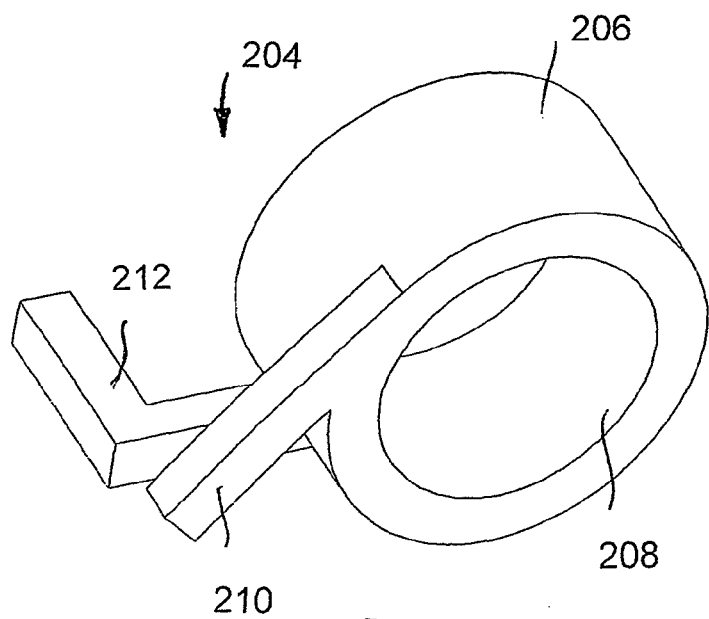
FIG. 35 is a perspective view of the main pawl spring.
Figure 36:
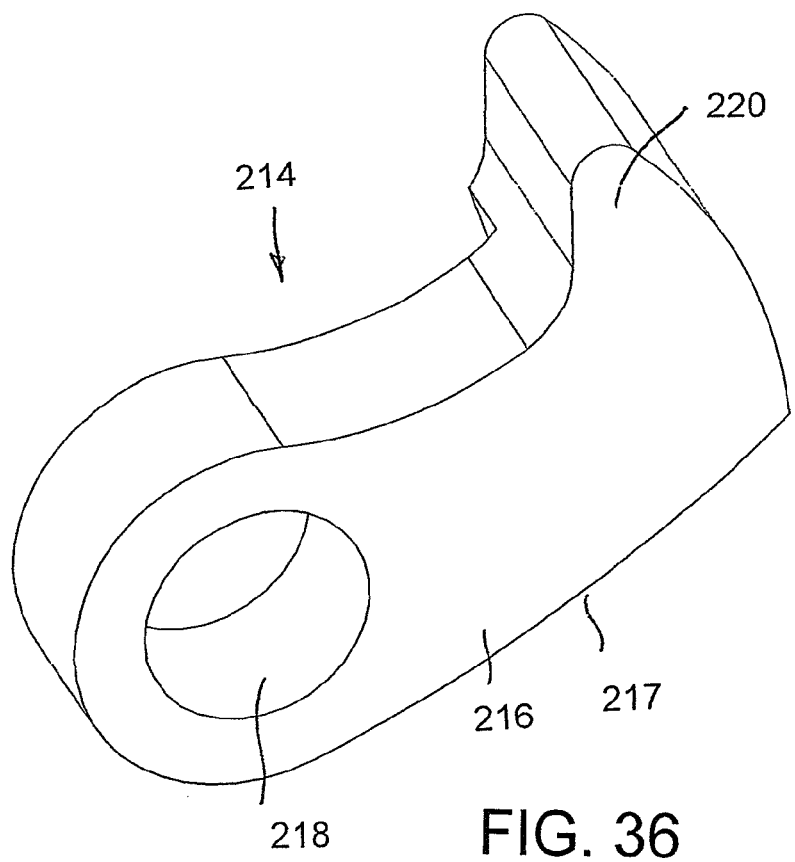
FIG. 36 is a perspective view of the inner facing side of the advance pawl.
Figure 37:
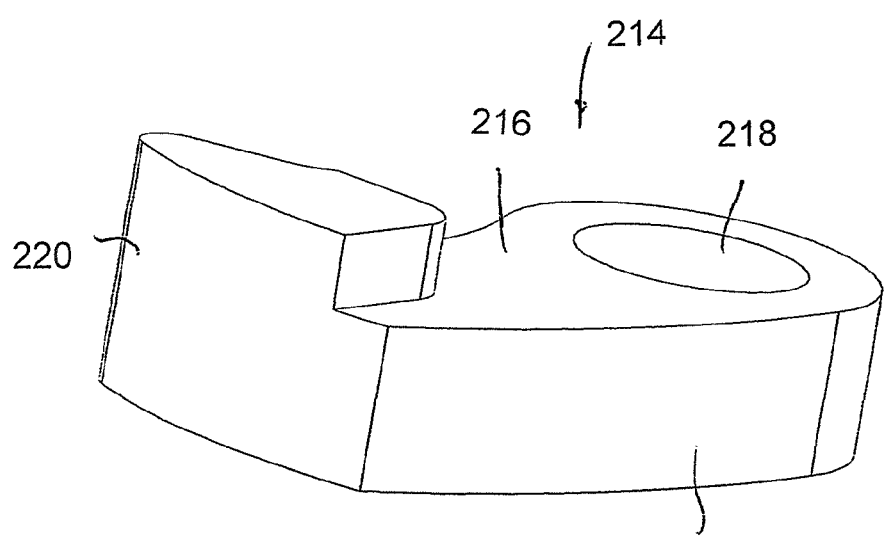
FIG. 37 is a perspective view of the outer facing side of the advance pawl.

As shown in FIGS. 5 and 29, a coiled torsion gear return spring 165 is mounted between second half housing shell 20 and triple gear pulley 150. The inner end of gear return spring 165 is bent to form a bent spring projection 167 that is fixed in offset opening 65 of second half housing shell 20, while the outer end of gear return spring 165 is bent to form a bent spring projection 169 that is fixed in small opening 157 adjacent triangular nose 156 of triple gear pulley 150. In this manner, gear return spring 165 functions to normally bias gear return spring 165 in the counterclockwise direction of FIG. 4.

As shown best in FIGS. 3-5, 30 and 31, a pawl flange 170 is fixed to the outer facing surface of second half housing shell 20. Pawl flange 170 includes a plate 171 having a main section 172 and a finger section 174 extending therefrom. Finger section 174 includes a through bore 176 through which a bolt 178 (FIGS. 3 and 4) extends from the outer facing side thereof into threaded engagement with threaded opening 68 to fixedly secure pawl flange 170 to second half housing shell 20. Pawl flange 170 further includes a short post 180 extending from the inner facing surface thereof at a left end position of main section 172 of plate 171 and a tall post 182 extending from the inner facing surface thereof at a lower position on main section 172 of plate 171.

As shown in FIGS. 3-5, 32 and 33, a hold pawl 184 as part of an actuating arrangement is rotatably mounted on tall post 182 of pawl flange 170. Hold pawl 184 includes a pawl lever 186 having a substantially central through bore 188 which is mounted on tall post 182. A downwardly inclined pawl catch 190 is provided at one end of pawl lever 186 for engaging with gear teeth 166 of triple gear pulley 150, to be described hereafter. Further, a post 192 extends from the outer facing surface of pawl lever 186 at the end thereof opposite pawl catch 190 for engagement with the upper arcuate surface of further slightly arcuate raised wall 108.

As shown in FIGS. 3-5 and 34, a main pawl 194 as part of an actuating arrangement is then rotatably mounted on long post 182 of pawl flange 170 on top of hold pawl 184. Main pawl 194 includes a pawl lever 196 having an upper engagement surface 197 and a through bore 198 at one end by which main pawl 194 is mounted on tall post 182. A downwardly inclined pawl catch 200 is provided at an opposite end of pawl lever 196 for engaging with gear teeth 164 of triple gear pulley 150, to be described hereafter. Further, a post 202 extends from the outer facing surface of pawl lever 196 at the end thereof adjacent pawl catch 200 for engagement with the upper arcuate surface of slightly arcuate raised wall 106.

Figure 3:
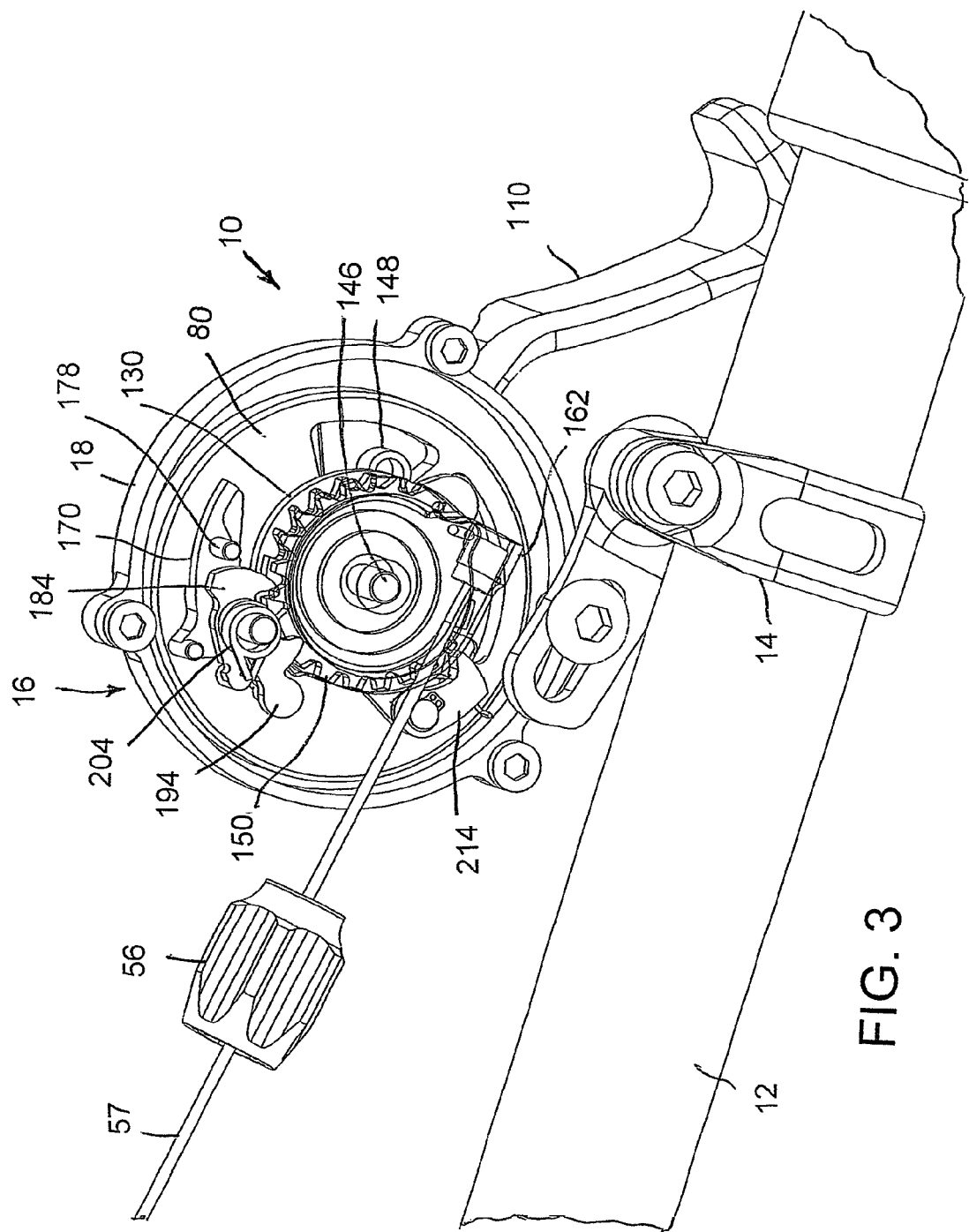
FIG. 3 is a perspective view of FIG. 1 with the second half housing shell removed.
Figure 4:
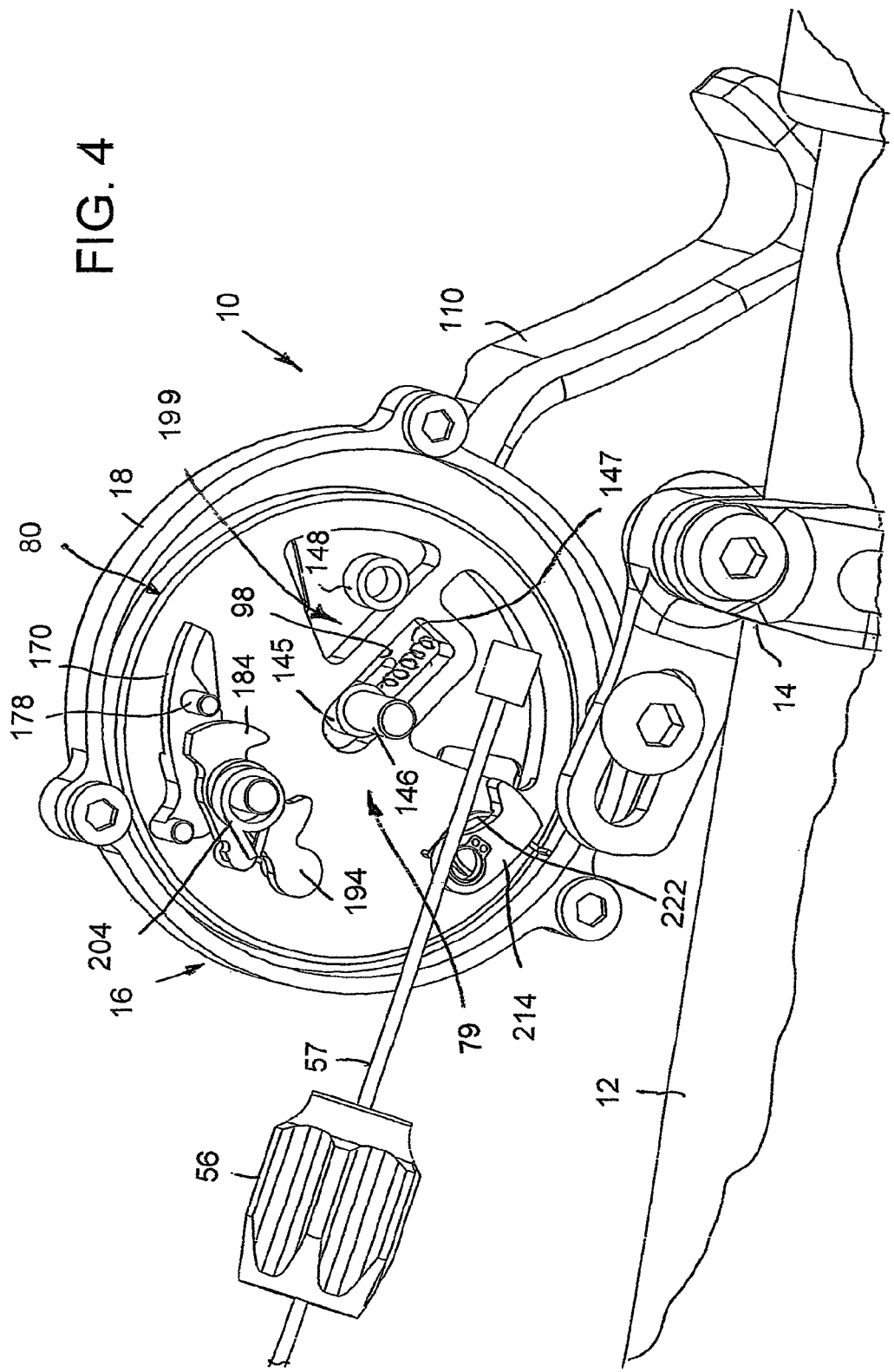
FIG. 4 is a perspective view of FIG. 1 with the second half housing shell, triple gear pulley and post sleeve removed.

A main pawl spring 204 normally biases pawl catch 200 into engagement with gear teeth 164, as shown in FIGS. 3 and 4. Specifically, main pawl spring 204 includes a cylindrical base 206 with a central through bore 208 through which tall post 182 extends. A first spring arm 210 extends from cylindrical base 206 at the inner facing end thereof and engages with the inner surface of annular inturned flange 42. A second L-shaped spring arm 212 extends from cylindrical base 206 at the outer facing end thereof and engages with upper engagement surface 197 of pawl lever 196. As a result, when an external force is applied to remove pawl catch 200 from gear teeth 164, spring arms 210 and 212 are tensioned, so that when the external force is removed, spring arms 210 and 212 force main pawl 194 in the counterclockwise direction of FIG. 13 to force pawl catch 200 into engagement with gear teeth 164.

As shown in FIGS. 3-5, 36 and 37, an advance pawl 214 as part of an actuating arrangement is rotatably mounted on post 140 of post sleeve 130. Advance pawl 214 includes a pawl lever 216 having a lower engagement surface 217 and a through bore 218 at one end by which advance pawl 214 is mounted on post 140 of post sleeve 130. An upwardly inclined pawl catch 220 is provided at an opposite end of pawl lever 216 for engaging with gear teeth 168 of triple gear pulley 150, to be described hereafter.

Figure 38:
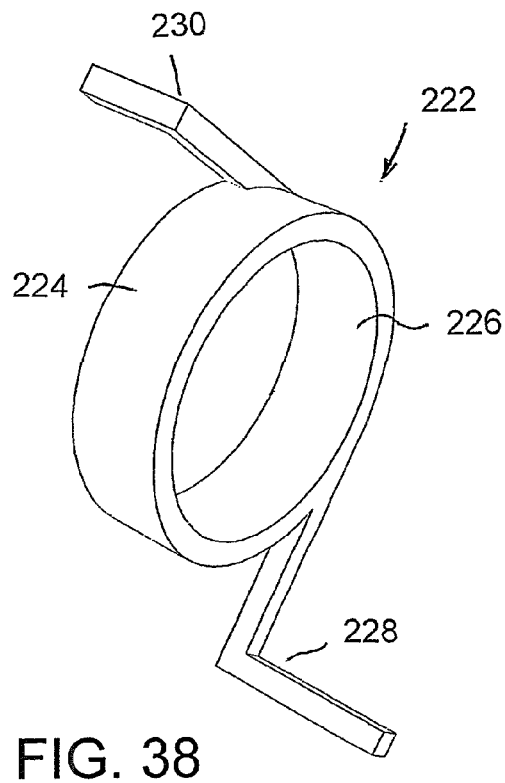
FIG. 38 is a perspective view of the advance pawl spring.
Figure 39:
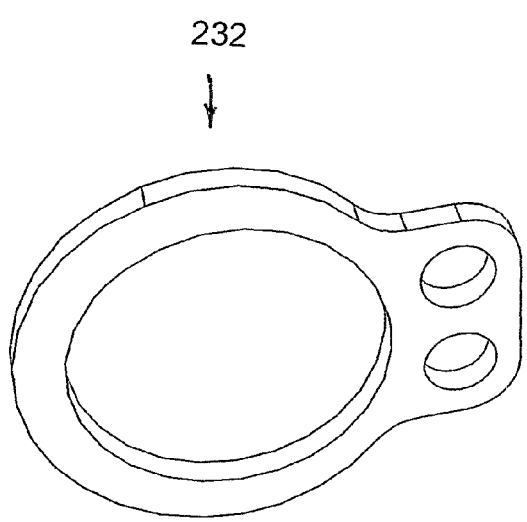
FIG. 39 is a perspective view of the advance pawl retaining ring.

An advance pawl spring 222 normally biases pawl catch 220 into engagement with gear teeth 168, as shown in FIGS. 3, 4 and 38. Specifically, advance pawl spring 222 includes a cylindrical base 224 with a central through bore 226 mounted on boss 138 of post sleeve 130 below advance pawl 214. A first L-shaped spring arm 228 extends from cylindrical base 224 at the outer facing end thereof and engages with the side edge of thin generally circular plate 132 of post sleeve 130. A second L-shaped spring arm 230 extends from cylindrical base 224 at the inner facing end thereof and engages with lower engagement surface 217 of advance pawl 214. As a result, when an external force is applied to remove pawl catch 220 from gear teeth 168, spring arms 228 and 230 are tensioned, so that when the external force is removed, spring arms 228 and 230 force advance pawl 214 in the counterclockwise direction of FIG. 3 to force pawl catch 220 into engagement with gear teeth 168.

As shown in FIGS. 3-5 and 39, an advance pawl retaining ring 232 is snap fit onto post 140 of post sleeve 130, and is held in annular groove 141 thereof, in order to retain advance pawl 214 and advance pawl spring 222 in position.

Figure 40:
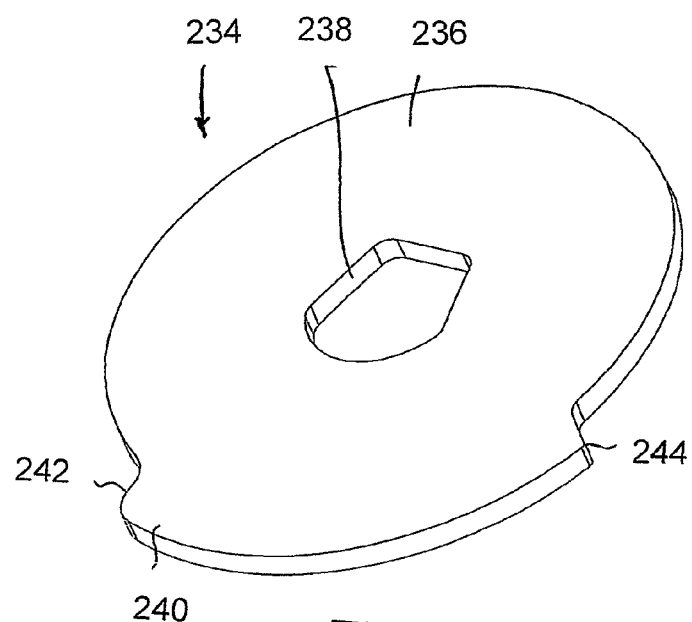
FIG. 40 is a perspective view of the return spring spacer.

Further, as shown in FIGS. 5 and 40, a return spring spacer 234 is mounted on substantially trapezoidal shaped upper end 60 of cylindrical boss 58 between post sleeve 130 and triple gear pulley 150. Specifically, return spring spacer 234 includes a substantially circular plate 236 with a center substantially trapezoidal shaped through bore 238 of the same shape and dimensions as substantially trapezoidal shaped upper end 60 so as to fit therearound. As a result, return spring spacer 234 is not rotatable. An arcuate flange 240 extends in a coplanar manner from the edge of circular plate 236 for an angle of approximately 90 degrees, and has opposite inclined 242 and 244.

In operation, in the neutral or rest position in which no gear change occurs, pawl catch 220 of advance pawl 214 sits on arcuate flange 240 of return spring spacer 234 and is thereby out of engagement with gear teeth 168. At this time, also, pawl catch 200 of main pawl 194 is biased by main pawl spring 204 into engagement with gear teeth 164 so that the particular gear of the derailleur stays in position. Hold pawl 184 is not biased into engagement with gear teeth 166, but may fall into one of these teeth by means of gravity.

Figure 41:
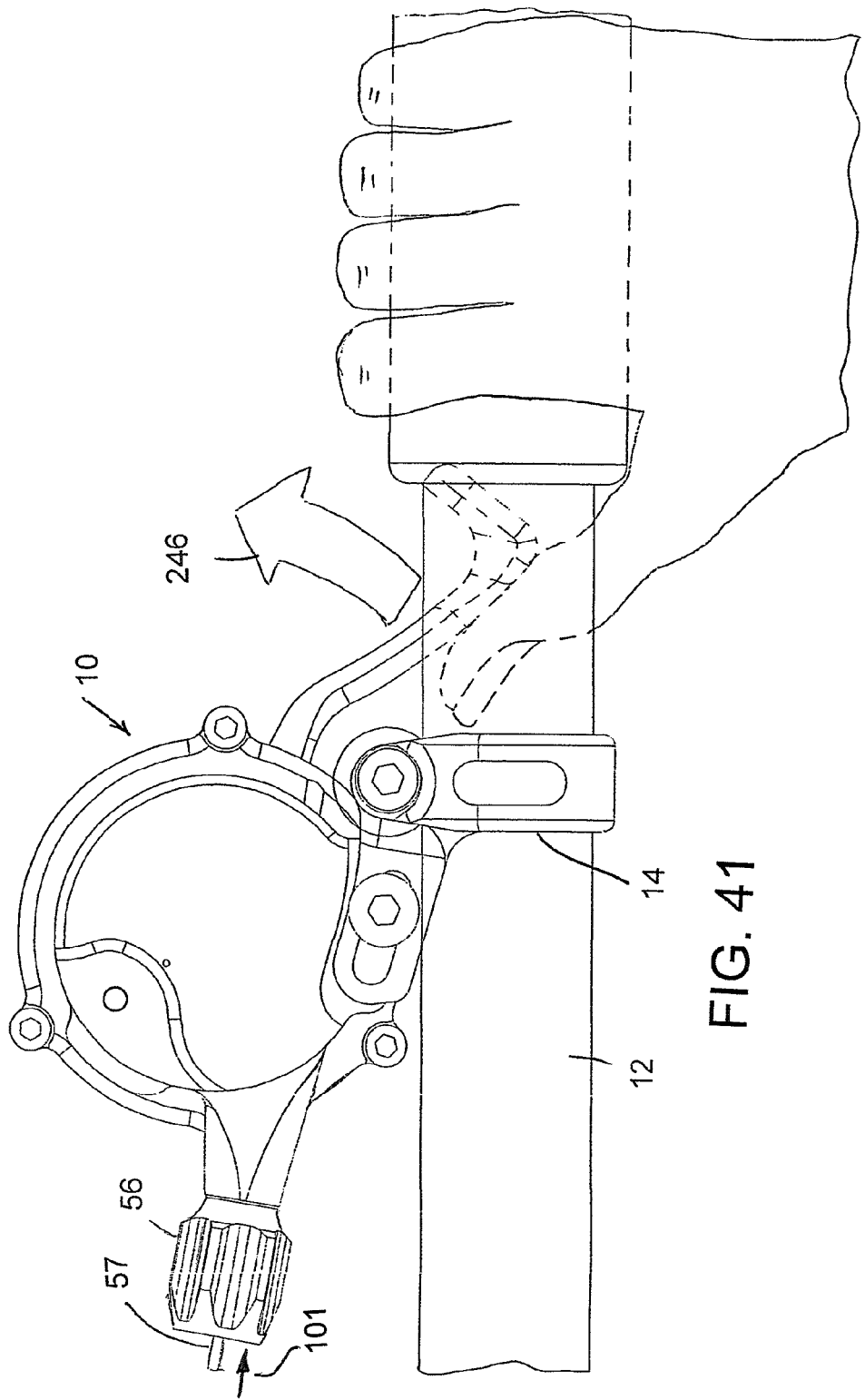
FIG. 41 is a perspective view of the shifter according to the present invention during a gear shifting operation in a first direction.

For shifting in a direction to pull cable 57 in a first shifting direction denoted by arrow 101, the person rotates shift lever 110 in a first pivoting direction of arrow 246 in FIG. 41, that is, in the counterclockwise direction thereof. Because slide 80 is fixed to shift lever 110, slide 80 also rotates in the same counterclockwise direction of FIG. 3. In this position, compression spring 147 maintains the centered position of slide 80. The amount of rotation of slide 80 is limited by advance roller 97 between stops 32 and 34 of first half housing shell 18. In addition, advance of first roller 97, during the initial rotation, is rotated to a position away from gap 35, and in front of arcuate guide wall 36, which prevents linear movement of shift lever 110, that is, which only allows rotational movement thereof. Arcuate guide wall 36 and advance roller 97 form a limiting arrangement 99 for preventing the substantially linear sliding movement of slide 80 upon movement of the single lever 110 in the first pivoting direction, that is, these elements form arrangement 99 for limiting movement of the single lever only in a rotational direction. Further, because advance roller 148 abuts against guide wall 103 of slide 80, post sleeve 130 also rotates in this counterclockwise direction. During this movement, advance pawl 214 rotates with post sleeve 130 and thereby moves past arcuate flange 240 of return spring spacer 234. As a result, advance pawl 214 is no longer restrained by arcuate flange 240 and is biased by advance pawl spring 222 into engagement with gear teeth 168. Continued rotation causes advance pawl 214 to thereby rotate triple gear pulley 150 in the counterclockwise direction of FIG. 3 in order to pull cable 57. During this movement, main pawl 194 is caused to move out of a gear tooth 164 by the force of this rotation and against the force of main pawl spring 204, and then be forced into engagement of the next gear tooth 164 by spring 204. Since shift lever 110 can be rotated a distance to effect up to four gear shiftings in a single movement, main pawl 194 would repeat this operation, that is, be moved out of one gear tooth 164 and into the next gear tooth 164, and so on, during this gear shifting operation. In like manner hold pawl 184 would perform a similar operation since it is not restrained at all.

When the rotational force on shift lever 110 is released, post sleeve 130 is biased in the clockwise direction by shift lever return spring 131. Because advance roller 148 abuts against guide wall 103 of slide 80, slide 80 and shift lever 110 also rotate in this clockwise direction. Because of the configuration of pawl catch 220 of advance pawl 214, pawl catch 220 is caused to move in and out of gear teeth 168 during this return movement. In other words, advance pawl 214 is configured to move triple gear pulley 150 only in the counterclockwise direction. It is note that the tension on cable 57 would normally force triple gear pulley 150 back in the clockwise direction. However, to retain triple gear pulley 150 is this changed gear position, main pawl 194 engages gear teeth 164 and holds triple gear pulley 150 in position, because there is no rotational force of advance pawl 214 on triple gear pulley 150. In this regard, cable 57 is pulled to effect a shifting operation in first direction denoted by arrow 101.

For shifting in the opposite direction, the person linearly moves shift lever 110 in the direction of arrow 248 in FIG. 42 in a second substantially linear direction. Preferably, there is no rotational movement of shift lever 110, that is, movement is purely linear. Since slide 80 is fixed to shift lever 110, slide 80 also moves in this linear direction. As such, advance roller 97 on slide 80 moves through gap 35 on first half housing shell 18.

Specifically, post sleeve or second roller 145 around the free end of center shaft 146 slidably moves within elongated recess 98 of slide 80 against the force of compression spring 147. In addition, advance roller 148 rides along guide wall 103 of slide 80. This arrangement of post sleeve roller 145 within elongated recess 98 of slide 80 and advance roller 148 riding along guide wall 103 of slide 80 together form an arrangement 199 for limiting movement of the single lever in a linear direction. It will be appreciated, however, that post sleeve 130 does not slide and is therefore stationary at this time. As a result, advance pawl 214 is restrained by arcuate flange 240 of return spring spacer 234, and is thereby out engagement with gear teeth 168 during this entire shifting operation.

During this sliding movement, slightly arcuate raised wall 106 of slide 80 engages post 202 of main pawl 194 to move downwardly inclined pawl catch 200 out of engagement with gear teeth 164 of triple gear pulley 150. At the same time, slightly arcuate raised wall 108 abuts post 192 of hold pawl 184 to move downwardly inclined pawl catch 190 into engagement with gear teeth 166 of triple gear pulley 150. Therefore, at this time, triple gear pulley 150 is held in position only by hold pawl 184. The spacing or pitch of gear teeth 166 is greater than the width of pawl catch 190 so that, during this initial engagement, triple gear pulley 150 is caused, by the pull force from cable 57, to rotate slightly in the clockwise direction of FIG. 3 by a slight distance equal to the difference between the spacing or pitch of gear teeth 166 and the width of pawl catch 190, until pawl catch 190 abuts against the edge of the respective gear tooth 166 to hold triple gear pulley 150 in position.

When the linear force applied to shift lever 110 is released, compression spring 147 forces slide 80 to move linearly to its original position. As a result, slightly arcuate raised wall 108 no longer abuts post 192 of hold pawl 184, whereby downwardly inclined pawl catch 190 can be moved out of engagement with gear teeth 166 of triple gear pulley 150. This occurs by reason of the tension on cable 57 moving triple gear pulley 150 in the clockwise direction of FIG. 3, whereby hold pawl 184 is forced by this rotation out of engagement with gear teeth 166. At the same time, slightly arcuate raised wall 106 of slide 80 no longer engages post 202 of main pawl 194, whereby main pawl spring 204 forces main pawl 194 to move in the counterclockwise direction of FIG. 3. However, triple gear pulley 150 already rotated slightly in the clockwise direction of FIG. 3, as described above. As a result, there is no gear tooth 164 for main pawl 194 to engage. Therefore, triple gear pulley 150 starts to rotate in the clockwise direction of FIG. 3 by reason of the tension on cable 57, until downwardly inclined pawl catch 200 of main pawl 194 engages the next tooth 166 and is forced into this next tooth 166 by main pawl spring 204 in order to hold triple gear pulley 150 in this position. As a result, cable 57 is released to effect a shifting operation in a second opposite direction denoted by arrow 103 in FIG. 42.

It will be appreciated that various modifications can be made to the invention within the scope of the claims. For example, rather than shift lever 110 moving only in a linear direction during the reverse shifting operation, it can move in a slightly arcuate path in which it also rotates slightly while moving linearly. Further, it is possible to effect the linear movement of shift lever 110 after shift lever 110 is first rotated a small distance. In this regard, reference in the claims to substantially linear covers all of these arrangements.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A gear shift arrangement for a bicycle that is separate and distinct from a brake lever of the bicycle, the bicycle having a derailleur and a derailleur cable associated therewith, said gear shift arrangement comprising:
   a single lever adapted to only perform a shifting operation of gears of the bicycle in a forward and reverse direction,
   a housing,
   a mounting arrangement in said housing for mounting the single lever for movement in a first pivoting direction and for movement in a second substantially linear direction, the mounting arrangement including:
      a shaft mounted to the housing, and
      a rotatable slide element to which the single lever is fixed, the rotatable slide element having an elongated slot by which the rotatable slide element is slidable relative to the shaft, and the rotatable slide element also being rotatable relative to the shaft, and
   a shift control mechanism in said housing and connected with the mounting arrangement for controlling shifting of the gears of the bicycle in a first shifting direction upon movement of the single lever in the first pivoting direction and for controlling shifting of gears of the bicycle in a second, opposite shifting direction upon movement of the single lever in the second substantially linear direction.

2. A gear shift arrangement according to claim 1, wherein said shift control mechanism includes a pulley rotatably mounted in said housing and around which the cable extends, and an actuating arrangement connected between said mounting arrangement and said pulley for controlling rotation of said pulley to either pull or release said cable in dependence upon movement of said shift lever.

3. A gear shift arrangement according to claim 2, wherein said pulley includes a plurality of sets of gear teeth therearound, and said actuating arrangement includes a plurality of pawls for engaging said gear teeth in dependence upon movement of said shift lever.

4. A gear shift arrangement according to claim 3, wherein said actuating arrangement includes:
   a rotatable element rotatably mounted in said housing and adapted to be rotated by said mounting arrangement upon movement of the single lever in the first pivoting direction,
   an advance pawl as one of said pawls pivotally mounted on said rotatable element, and
   an advance pawl spring for biasing said advance pawl into engagement with a first said set of gear teeth on said pulley to rotate said pulley upon rotation of said rotatable element, to pull said cable,
   wherein said advance pawl is configured so that said advance pawl is adapted to engage and rotate said pulley only in a direction to pull said cable.

5. A gear shift arrangement according to claim 4, wherein said actuating arrangement includes:
   a rotatable element spring for rotationally biasing said rotatable element,
   a main pawl as one of said pawls pivotally mounted to said housing for holding said pulley upon rotation thereof when said shift lever is released and when said rotatable element and said advance pawl are rotated back by said rotatable element spring, and
   a main pawl spring for biasing said main pawl into engagement with a second said set of gear teeth on said pulley.

6. A gear shift arrangement according to claim 5, wherein said rotatable slide element is mounted in said housing for substantially linear sliding movement and rotatable movement with said shift lever.

7. A gear shift arrangement according to claim 6, further comprising a limiting arrangement connected with the rotatable slide element for preventing said substantially linear sliding movement of said rotatable slide element upon movement of the single lever in the first pivoting direction.

8. A gear shift arrangement according to claim 6,
   wherein said rotatable slide element is adapted to be moved in said housing for substantially linear sliding movement, upon movement of the single lever in the substantially linear direction, and
   wherein said actuating arrangement includes:
      a substantially linear biasing arrangement for biasing said rotatable slide element,
      a hold pawl as one of said pawls pivotally mounted to said housing for permitting an incremental rotational movement of said pulley, and
      a pawl biasing arrangement on said rotatable slide element for biasing said hold pawl into engagement with a third said set of gear teeth on said pulley upon movement of the single lever in the substantially linear direction to said first linear slid position in order to effect said incremental rotational movement of said pulley.

9. A gear shift arrangement according to claim 8, wherein:
   said pawl biasing arrangement includes a raised abutment that engages an end of said hold pawl upon movement of the single lever and rotatable slide element in the substantially linear direction to said first linear slid position to bias said hold pawl into engagement with said third said set of gear teeth and to bias said main pawl out of engagement with said second set of gear teeth, and
   said third set of gear teeth have a pitch greater than a width of said hold pawl to permit an incremental rotation of said pulley when said hold pawl is initially engaged therein, in a direction to release the cable.

10. A gear shift arrangement according to claim 9, wherein, upon return of said shift lever and rotatable slide element, said hold pawl is no longer biased into engagement with said third set of gear teeth by said pawl biasing arrangement, and said main pawl is biased into engagement by said main pawl spring with said second set of gear teeth to hold said pulley in an incrementally rotated cable release position.

11. A gear shift arrangement according to claim 8, wherein said actuating arrangement includes a holding arrangement for holding said advance pawl out of engagement with said first gear teeth during movement of the single lever in the substantially linear direction.

12. A gear shift arrangement according to claim 8, further comprising a limiting arrangement for preventing rotational movement of said rotatable element upon movement of the single lever in the substantially linear direction.

13. A gear shift arrangement according to claim 3, wherein:
   said rotatable slide element is mounted in said housing for substantially linear sliding movement with said shift lever from an initial position to a first linear slid position, upon movement of the single lever in the substantially linear direction, and
   said actuating arrangement includes:
      a substantially linear biasing arrangement for biasing said rotatable slide element to said initial position,
      a hold pawl as one of said pawls pivotally mounted to said housing for permitting an incremental rotational movement of said pulley, and
      a pawl biasing arrangement on said rotatable slide element for biasing said hold pawl into engagement with a first said set of gear teeth on said pulley upon movement of the single lever in the substantially linear direction to said first linear slid position in order to effect said incremental rotational movement of said pulley.

14. A gear shift arrangement according to claim 13, wherein said actuating arrangement further includes:
   a main pawl as one of said pawls pivotally mounted to said housing;
   a main pawl spring for biasing said main pawl into engagement with a second said set of gear teeth on said pulley to hold said pulley in an incrementally rotated position upon movement of the single lever in the substantially linear direction back to said initial position.

15. A gear shift arrangement according to claim 14, wherein:
   said pawl biasing arrangement includes a raised abutment that engages an end of said hold pawl upon movement of the single lever and rotatable slide element in the substantially linear direction to said first linear slid position to bias said hold pawl into engagement with said first said set of gear teeth and to bias said second pawl out of engagement with said second set of gear teeth, and
   said first set of gear teeth have a pitch greater than a width of said hold pawl to permit said incremental rotation of said pulley when said hold pawl is initially engaged therein, in a direction to release the cable.

16. A gear shift arrangement according to claim 15, wherein, upon return of said shift lever to said initial position, said hold pawl is no longer biased into engagement with said first set of gear teeth and said main pawl is biased into engagement by said main pawl spring with said second set of gear teeth to hold said pulley in an incrementally rotated cable release position.

17. A gear shift arrangement for a bicycle that is separate and distinct from a brake lever of the bicycle, the bicycle having a derailleur and a derailleur cable associated therewith, said gear shift arrangement comprising:
   a housing,
   a single lever mounted in the housing, the single lever being rotationally mounted in the housing around an axis and being configured to move in the housing in a linear direction orthogonal to said axis during a shifting operation of gears of the bicycle, the single lever adapted to only perform a shifting operation of gears of the bicycle,
   a mounting element in said housing, the mounting element including an elongated slot,
   a shaft rotationally and slidably mounted in the slot,
   an arrangement including a first roller and an arcuate guide wall for limiting movement of the first roller and thereby the single lever only in a rotational direction when an external pivoting force is applied to the single lever for shifting of gears in a first direction to cause only relative rotational movement between the shaft and the mounting element, an arrangement including a linear wall and a second roller mounted for movement along the linear wall for limiting movement of the single lever in said linear direction when an external force is applied linearly along a lengthwise direction of the single lever for shifting of the gears in a second opposite direction, wherein the shaft is only rotationally movable in the slot during pivoting movement of the single lever in the housing and the shaft is movable in said linear direction during linear movement of the single lever in the housing.

\* \* \* \* \*